United States Patent
Souliotis et al.

(10) Patent No.: US 10,740,716 B1
(45) Date of Patent: Aug. 11, 2020

(54) METHODS AND SYSTEMS FOR COORDINATING PHYSICAL TRANSPORT OF AN OBJECT UTILIZING ARTIFICIAL INTELLIGENCE

(71) Applicant: I TRANSPORT, LLC, New London, NH (US)

(72) Inventors: John Souliotis, New London, NH (US); Aristotle Souliotis, Williston, VT (US); Henry Perez, Maywood, NJ (US)

( * ) Notice: Subject to any disclaimer, the term of this patent is extended or adjusted under 35 U.S.C. 154(b) by 0 days.

(21) Appl. No.: 16/552,051

(22) Filed: Aug. 27, 2019

(51) Int. Cl.
*G06Q 10/08* (2012.01)
*G06Q 50/30* (2012.01)
*G06N 20/00* (2019.01)
*G06Q 10/04* (2012.01)

(52) U.S. Cl.
CPC ....... *G06Q 10/08355* (2013.01); *G06N 20/00* (2019.01); *G06Q 10/047* (2013.01); *G06Q 10/0836* (2013.01); *G06Q 50/30* (2013.01)

(58) Field of Classification Search
CPC .......... G06Q 10/08355; G06Q 10/047; G06Q 10/0836; G06Q 50/30; G06N 20/00
USPC ........................................................ 705/338
See application file for complete search history.

(56) References Cited

U.S. PATENT DOCUMENTS

| | | |
|---|---|---|
| 9,581,455 B2 | 2/2017 | Lord et al. |
| 9,710,780 B2 | 7/2017 | Anderson et al. |
| 9,749,930 B2 | 8/2017 | Choi et al. |
| 10,417,690 B2 * | 9/2019 | Mueller ............... G06Q 30/016 |
| 2003/0084125 A1 * | 5/2003 | Nagda ................... G06Q 10/08 709/219 |
| 2016/0071055 A1 * | 3/2016 | Beckwitt .......... G06Q 10/08345 705/39 |
| 2016/0180274 A1 | 6/2016 | Zwakhals et al. |

(Continued)

FOREIGN PATENT DOCUMENTS

WO    WO-0133458 A1 *   5/2001   ......... G06Q 30/0601

OTHER PUBLICATIONS

Globaltranz. "How Machine Learning is Transforming Logistics". Web archived on Feb. 15, 2018. https://web.archive.org/web/20180215143649/http://www.globaltranz.com/blog/how-machine-learning-is-transforming-logistics (Year: 2018).*

(Continued)

*Primary Examiner* — Shannon S Campbell
*Assistant Examiner* — Lisa Ma
(74) *Attorney, Agent, or Firm* — Caldwell Intellectual Property Law

(57) ABSTRACT

A system for coordinating physical transport of an object utilizing artificial intelligence. The system includes at least a server designed and configured to receive carrier capabilities data from a carrier device and to receive sender request data from a sender device. The system includes a carrier opportunity forecasting engine operating on the at least a server designed and configured to generate a carrier opportunity output. The system includes a sender opportunity forecasting engine operating on the at least a server designed and configured to generate a sender opportunity output. The system includes a sender qualification module operating on the at least a server designed and configured to generate at least an applicable object output. The system includes a carrier qualification module operating on the at least a server designed and configured to generate at least an applicable carrier index output.

20 Claims, 14 Drawing Sheets

(56) References Cited

U.S. PATENT DOCUMENTS

| | | |
|---|---|---|
| 2017/0109696 A1 | 4/2017 | Serjeantson et al. |
| 2017/0132675 A1* | 5/2017 | Myers ................ G06Q 30/0282 |
| 2017/0213273 A1 | 7/2017 | Dietrich et al. |
| 2017/0213308 A1 | 7/2017 | Wellborn et al. |
| 2017/0236088 A1 | 8/2017 | Rao |
| 2017/0249581 A1 | 8/2017 | Buurb |
| 2018/0075408 A1* | 3/2018 | Subramanian ... G06Q 10/08345 |
| 2018/0349849 A1* | 12/2018 | Jones .................... G06N 20/00 |
| 2019/0205829 A1* | 7/2019 | Abebe ................... G06N 20/00 |

OTHER PUBLICATIONS

Cheaply and easily send and deliver shipments; ttps://ikbenpeer.nl/en/; Sep. 14, 2017.
Cargomatic; More jobs. More money.; https://www.cargornatic.com/carriers/; Sep. 14, 2017.
Tugforce; https://www.tugforce.com/carrier.html; Sep. 14, 2017.

* cited by examiner

METHODS AND SYSTEMS FOR COORDINATING PHYSICAL TRANSPORT OF AN OBJECT UTILIZING ARTIFICIAL INTELLIGENCE

FIELD OF THE INVENTION

The present invention generally relates to the field of artificial intelligence. In particular, the present invention is directed to methods and systems for coordinating physical transport of an object utilizing artificial intelligence.

BACKGROUND

Historically, individuals are presented with narrow options for physically transporting an object. The narrow possibilities present a broad field of both opportunities and challenges. One challenge among many is how to transport an object, by any means of transportation, in a manner that is efficient by communicating directly with the person participating in physical transport of the object while ensuring the protection of the object and requirements associated with the object. While many solutions to this and related challenges have been presented, none solves the underlying problem in a completely satisfactory manner.

SUMMARY OF THE DISCLOSURE

In an aspect, a system for coordinating physical transport of an object utilizing artificial intelligence is provided. The system comprises at least a server. The at least a server is designed and configured to receive carrier capabilities data from at least a carrier device, wherein the carrier capabilities data further comprises at least an upcoming trip datum and at least an object prospect datum. The at least a server is further designed and configured to receive sender request data from at least a sender device, wherein the sender request data further comprises at least an object detail datum and at least a carrier stipulation datum. The system includes a carrier opportunity forecasting engine operating on the at least a server, wherein the carrier opportunity forecasting engine is configured to store the sender request data, for each sender device of the plurality of sender devices, in at least a sender database. The carrier opportunity forecasting engine operating on the at least a server is further designed and configured to receive a first training data set including a plurality of first data entries. Each first data entry of the plurality of first data entries including at least a sender requirement label and at least a correlated sender possibility label. The carrier opportunity forecasting engine operating on the at least a server is further designed and configured to generate a carrier opportunity output using the first training set and the at least a sender database; and transmit the carrier opportunity output to the at least a carrier device. The system further includes a sender opportunity forecasting engine operating on the at least a server wherein the sender opportunity forecasting engine is configured to store the carrier capabilities data, for each carrier device of the plurality of carrier devices, in at least a carrier database. The sender opportunity forecasting engine operating on the at least a server is further designed and configured to receive a second training data set including a plurality of second training data entries. Each second data entry of the plurality of second data entries including at least a carrier requirement label and at least a correlated carrier possibility label. The sender opportunity forecasting engine operating on the at least a server is further designed and configured to generate a sender opportunity output using the second training set and the at least a carrier database; and transmit the sender opportunity output to the at least a sender device. The system further includes a sender qualification module operating on the at least a server wherein the sender qualification module is configured to identify at least a sender requirement label and generate at least an applicable object output as a function of the first training data set and the carrier capabilities data. The system further includes a carrier qualification module operating on the at least a server wherein the carrier qualification module is configured to identify at least a carrier requirement label and generate at least an applicable carrier index output as a function of the second training data set and the sender request data.

In another aspect, a method coordinating physical transport of an object utilizing artificial intelligence is provided. The method includes receiving, by at least a server, carrier capabilities data, wherein carrier capabilities data further comprises receiving at least an upcoming trip datum from a carrier device and receiving at least an object prospect datum from a carrier device. The method further includes receiving, by at least a server, sender request data, wherein sender request data further comprises receiving at least an object datum from a sender device and receiving at least a carrier stipulation datum from a sender device. The method further includes transmitting by at least a carrier opportunity forecasting engine operating on the at least a server the at least a carrier opportunity output to the at least a carrier device. Transmitting the at least a carrier opportunity output further comprises storing the sender request data, for each sender device of the plurality of sender devices, in at least a sender database. Transmitting the at least a carrier opportunity output further comprises receiving a first training data set including a plurality of first data entries. Each first data entry of the plurality of first data entries including at least a sender requirement label and at least a correlated sender possibility label. Transmitting the at least a carrier opportunity output further comprises generating the at least a carrier opportunity output using the first training set and the at least a sender database. The method further includes transmitting by at least a sender opportunity forecasting engine operating on the at least a server the at least a sender opportunity output to the at least a sender device. Transmitting the at least a sender opportunity output further comprises storing the carrier capabilities data in at least a carrier database for each carrier device of the plurality of carrier devices. Transmitting the at least a sender opportunity output further comprises receiving a second training data set including a plurality of second data entries. Each second data entry of the plurality of second data entries including at least a carrier requirement label and at least a correlated carrier possibility label. Transmitting the at least a sender opportunity output further comprises generating a sender opportunity output using the second training set and the at least a carrier database. The method further includes generating by at least a sender qualification module operating on the at least a server the at least an applicable object output as a function of the first training data set and the carrier capabilities data. Generating at least an applicable object output further comprises identifying at least a sender requirement label. The method further includes generating by at least a carrier qualification module operating on the at least a server at least an applicable carrier index output as a function of the second training data set and the sender request data. Generating at least an applicable carrier output further comprises identifying at least a carrier requirement label.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for coordinating physical transport of an object utilizing artificial intelligence. In an embodiment, a server receives carrier capabilities data from a carrier device. Information contained within carrier capabilities data may be utilized to generate a carrier opportunity output and an applicable object output. In an embodiment, carrier opportunity output may be optimized to deliver optimal predictive object recommendations to the carrier device based on previous carrier interactions with the server. In an embodiment, applicable object output may be optimized to deliver optimal object recommendations as a function of carrier capabilities data. In an embodiment, a server receives sender request data from a sender device. Information contained within sender request data may be utilized to generate a sender opportunity output and an applicable carrier index output. In an embodiment, sender opportunity output may be optimized to deliver optimal predictive carrier recommendations to the sender device based on previous sender interactions with the server. In an embodiment, applicable carrier index output may be optimized to deliver optimal carrier recommendations as a function of sender request data.

Figure 1:
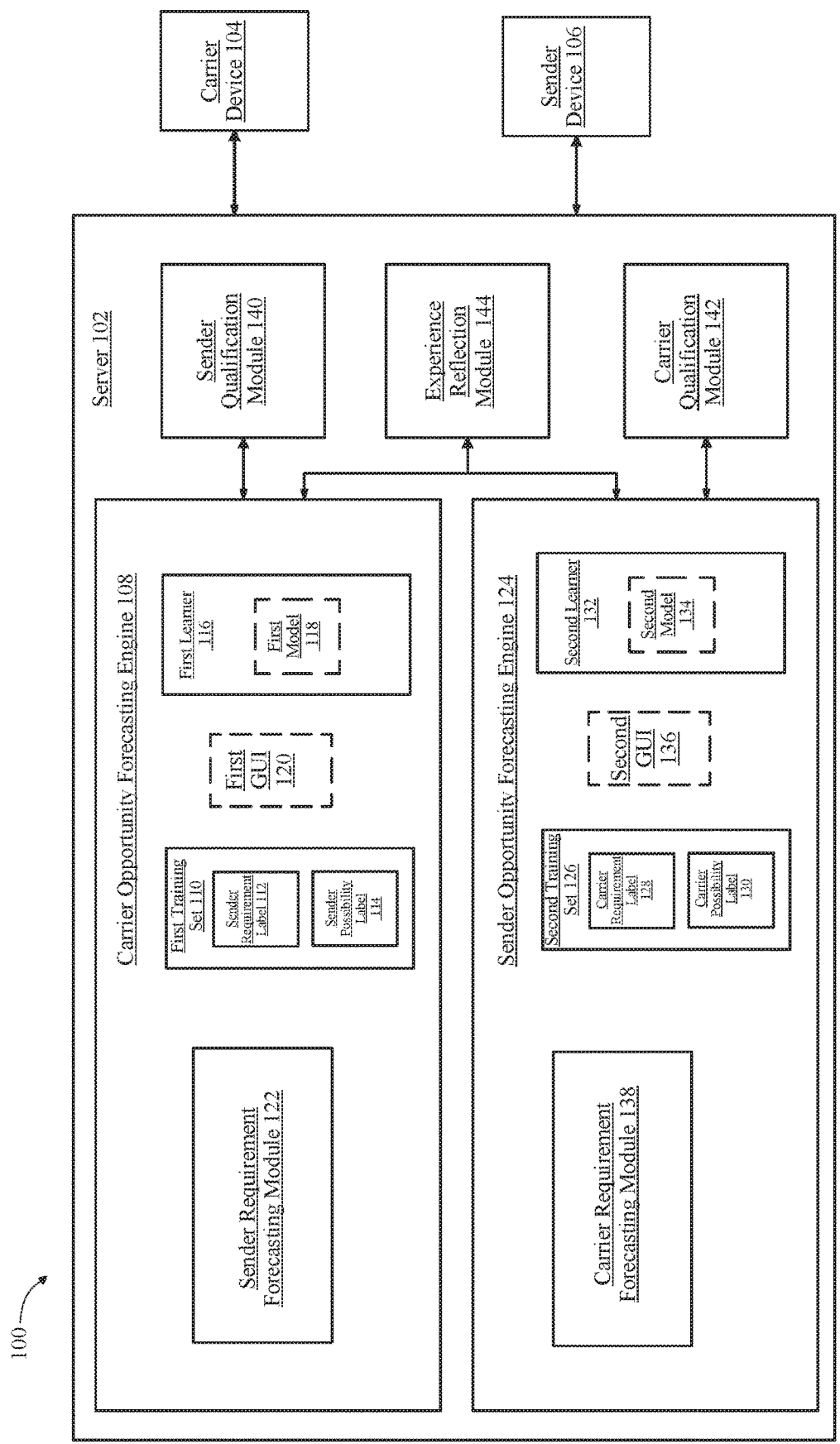
FIG. 1 is a high-level block diagram illustrating an exemplary embodiment of a system for coordinating physical transport of an object utilizing artificial intelligence.

Turning now to FIG. 1, a system 100 for coordinating physical transport of an object utilizing artificial intelligence is illustrated. System 100 includes at least a server 102. At least a server 102 may include any computing device as described herein, including without limitation a microcontroller, microprocessor, digital signal processor (DSP) and/or system on a chip (SoC) as described herein. At least a server 102 may be housed with, may be incorporated in, or may incorporate one or more sensors of at least a sensor. Computing device may include, be included in, and/or communicate with a mobile device such as a mobile telephone or smartphone. At least a server 102 may include a single computing device operating independently, or may include two or more computing device operating in concert, in parallel, sequentially or the like; two or more computing devices may be included together in a single computing device or in two or more computing devices. At least a server 102 with one or more additional devices as described below in further detail via a network interface device. Network interface device may be utilized for connecting a at least a server 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. At least a server 102 may include but is not limited to, for example, a at least a server 102 or cluster of computing devices in a first location and a second computing device or cluster of computing devices in a second location. At least a server 102 may include one or more computing devices dedicated to data storage, security, distribution of traffic for load balancing, and the like. At least a server 102 may distribute one or more computing tasks as described below across a plurality of computing devices of computing device, which may operate in parallel, in series, redundantly, or in any other manner used for distribution of tasks or memory between computing devices. At least a server 102 may be implemented using a "shared nothing" architecture in which data is cached at the worker, in an embodiment, this may enable scalability of system 100 and/or computing device.

Continuing to refer to FIG. 1, server 102 may be designed and configured to receive carrier capabilities data from at least a carrier device 104. Carrier capabilities data further comprises receiving at least a carrier-input upcoming trip datum and at least a carrier-input object prospect datum from carrier device 104. An upcoming trip datum, as described herein, is an element of data identifying and/or describing particulars of a planned future travel for a carrier; upcoming trip datum may be evaluated with regard to one or more measures of travel details, and/or any measures of the carrier useful for object transportation purposes. Upcoming trip datum may include, without limitation, a carrier starting point, such as the location from which the carrier is starting the trip and will be able to pick up objects to deliver. Upcoming trip datum may include, without limitation, a carrier ending point, such as the location with which the carrier determines to be the destination of the trip and will be able to deliver objects to. Upcoming trip datum may include, without limitation, a distance the carrier is willing to deviate from the planned route, such as the carrier is willing to go 20 miles off route to deliver a package, and the like. Upcoming trip datum may include, without limitation, a time the carrier is starting a trip and/or an ending time the carrier is planning to arrive at a destination, and the like. An object prospect datum, as described herein, is an element of data identifying and/or describing specifications of the one or more object the carrier is able to deliver; object prospect datum may be evaluated with regard to one or more measures of object constraints, and/or and measure of the limitations a carrier may exhibit during delivery. Object prospect datum may include, without limitation, a size limitation on what object will be able to fit in the carrier's mode of transportation, such as a carrier can only transport objects smaller than four feet wide by four feet tall. Object prospect datum may include, without limitation, a weight limitation on what object will fit into the carrier's mode of transportation, such as a carrier may only transport objects smaller than 30 lbs, and the like. Object prospect datum may include, without limitation, a contraband on specific articles, such as the carrier will not transport objects containing open liquid, and the like. Persons skilled in the art, upon reviewing the entirety of this disclosure, will be aware of various alternative carrier capabilities data that may be applied in embodiments of system 100.

With continuing reference to FIG. 1, server 102 may be further designed and configured to receive sender request data from at least a sender device 106. Sender request data further comprises receiving at least a sender-input object detail datum and at least a carrier stipulation input from sender device 106. An object detail datum, as described herein, is an element of data identifying and/or describing specifications of the one or more object the sender desires to have delivered; object detail datum may be evaluated with regard to one or more measures of object constraints, and or measure of the limitations the object may include during delivery. Object detail datum may include, without limitation, a size specification describing the size of the object to be transported, such as a height of the object, width of the object, weight of the object. Object detail datum may include, without limitation, a configuration specification describing the configuration of the object and/or objects to be delivered, such as a description that each of the three lamp shades are packaged separately, and the like. Object detail datum may include, without limitation, a content description providing insight as to what the object being shipped includes, such as a warning that the contents are breakable, a notification that the object is a living organism, a notification that the content of the object includes a noisemaker, and the like. A carrier stipulation input, as described herein, is an element of data identifying and/or describing qualifications of the carrier and/or carrier mode of transportation necessary to ensure proper object delivery; carrier stipulation input may be evaluated with regard to one or more measures of carrier requirements, and/or any measure of the carrier useful in determining ability to deliver given object. Carrier stipulation input may include, without limitation, a security clearance requirement of the carrier, such as the object to be transported required the carrier have a security clearance, and the like. Carrier stipulation input may include, without limitation, a license requirement of the carrier, such as the object to be transported requires the carrier have a gun license, medical license, commercial driving license, and the like. Carrier stipulation input may include, without limitation, a requirement for a confirmation signature from the carrier upon successful transportation, such as a sender may require the carrier receive a signature from the object recipient upon successful transport of the object. Persons skilled in the art, upon reviewing the entirety of this disclosure, will be aware of various sender request data that may be applied in embodiments of system 100.

Still referring to FIG. 1, system 100 includes a carrier opportunity forecasting engine 108 operating on the at least a server 102, wherein the carrier opportunity forecasting engine 108 is configured to receive a first training data set including a plurality of first data entries, each first data entry of the plurality of first data entries including at least a sender requirement label and at least a correlated sender possibility label; create at least a first machine-learning model relating carrier capabilities data to sender possibility labels using the at least a first training set and at least a sender database; generate a carrier opportunity output using the first training set and the at least a sender database; and transmit the carrier opportunity output to the at least a carrier device. At least a server 102, carrier opportunity forecasting engine 108, and/or one or more modules operating thereon may be designed and/or configured to perform any method, method step, or sequence of method steps in any embodiment described in this disclosure, in any order and with any degree of repetition. For instance, at least a server 102 and/or carrier opportunity forecasting engine 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 102 and/or carrier opportunity forecasting engine 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, carrier opportunity forecasting engine 108 may be designed and configured to receive training data. Training data, as used herein, is data containing correlation that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name and/or a description of an object to be delivered or upcoming trip may be identified by reference to a list, dictionary, or other compendium of terms, permitting ad-hoc categorization by machine-learning algorithms, and/or automated association of data in the data entry with descriptors or into a given format. The ability to categorize data entries automatically may enable the same training data to be made applicable for two or more distinct machine-learning algorithms as described in further detail below.

Still referring to FIG. 1, carrier opportunity forecasting engine 108 may be designed configured to receive a first training set 110 including a plurality of first data entries, each first data entry of the first training set 110 including at least a sender requirement label 112 and at least a correlated sender possibility label 114. A sender requirement label, as described herein, is an element of data identifying and/or describing requirements and/or needs an object and/or sender need to satisfy to enable the carrier to deliver; sender requirements may be evaluated with regard to one or more measures of load and/or travel capabilities of a carrier's mode of transportation, one or more measures of carrier availability, one or more measures of carrier credentials, one or more measures of carrier object content limitations, and/or any measures of the carrier useful for object transportation purposes. Sender requirement label 112 may include, without limitation, object limitations, such as object size and/or weight restraints. Object limitation may include, without limitation, a size limitation on what object will be able to fit in the carrier's mode of transportation, such as a carrier can only transport objects smaller than four feet wide by four feet tall. Object limitation may include, without limitation, a weight limitation on what object will fit into the carrier's mode of transportation, such as a carrier may only transport objects smaller than 90 lbs, and the like. Object limitation may include, without limitation, a contraband on specific articles, such as the carrier will not transport objects containing open liquid, no glass, no perishables, no living organisms, no object noise, no odor, no weaponry, no illegal narcotics and/or paraphernalia, object exceeding a monetary limit, and the like. and the like. Sender requirement label 112 may include, without limitation, travel details, such as a location, and/or carrier availability. Travel details may include, without limitation, a carrier starting point, such as the location from which the carrier is starting the trip and will be able to pick up objects to deliver. Travel details may include, without limitation, a carrier ending point, such as the location with which the carrier determines to be the destination of the trip and will be able to deliver objects to. Travel details may include, without limitation, a distance the carrier is willing to deviate from the planned route, such as the carrier is willing to go 30 miles off route to deliver a package, carrier is willing to travel 15 minutes off the planned trip route to transport an object, and the like. Travel details may include, without limitation, a time the carrier is starting a trip and/or an ending time the carrier is planning to arrive at a destination, and the like. Sender requirement label 112 may include, without limitation, carrier credentials, such as a notary, security clearance, ability to transport biohazards, confidentiality agreements, and the like. Sender requirement label 112 may include any carrier capabilities data, as described above. Persons skilled in the art, upon reviewing the entirety of this disclosure, will be aware of various alternative sender requirement labels that may be applied in embodiments of system 100.

With continued reference to FIG. 1, sender requirement labels may include one or more carrier-entered descriptions of requirements and/or needs an object and/or sender need to satisfy to enable the carrier to deliver. One or more carrier-entered descriptions may include, without limitation, current or past transportation limitations, current or past trip details, current or past object limitations, such as size and/or weight, contents, required credentials, and the like, or any other carrier-entered data that the carrier may identify as a requirement, need, and/or restraint when delivering a given object.

Sender requirement labels may include any data suitable for use as carrier capabilities data received from one or more carrier device 104, including, without limitation, upcoming trip datum and/or object prospect datum. Examples of sender requirement label 112 described in this disclosure are presented for illustrative purposes only and are not meant to be exhaustive. Persons skilled in the art, upon reviewing the entirety of this disclosure, will be aware of various additional examples of sender requirement label 112 that may be used consistently with descriptions of systems and methods as provided in this disclosure.

Continuing to refer to FIG. 1, each element of first training set 110 includes at least an element of sender possibility label 114. A sender possibility label, as described herein, is an element of data identifying and/or describing a current, incipient, or probable characteristic of a sender; characteristics may include one or more features an object and/or sender must possess to enable the carrier to deliver. At least a sender possibility label may be associated with object dimension limitations, such as a maximum height and/or width of an object, object weight limitations, or any other limitation associated with the placement of the object during transport that may be associated with one or more sender requirement label 112. At least a sender possibility label may be associated with geographical elements, such as object and/or sender locations within a specified distance from a carrier location or object and/or sender destination within a specified distance from a carrier destination, or any other geographical positioning element associated with one or more sender requirement label 112 as described in further detail below. Characteristics associated with sender possibility labels may include, without limitation, required credentials, defined for our purposes herein as accreditation necessary to properly deliver object. Required credentials may include, without limitation, security clearance, confidentiality requirements, medical license, confirmation signature, gun license, commercial driving license, notary, insurance, bloodborne pathogens personal protective equipment (PPE) training, or any other required credential as described herein. Characteristics associated with sender possibility labels may include, without limitation, object content constraints, defined for our purposes herein as restrictions on the content of the object to be delivered. Restrictions may include, without limitation, prohibition of liquid, glass, living organisms, noise, weaponry, illegal narcotics, a monetary limit, or any other object content constraints as described herein. The above-described examples are presented for illustrative purposes only and are not intended to be exhaustive. Persons skilled in the art, upon reviewing the entirety of this disclosure, will be aware of various additional examples of characteristics that may be associated with sender possibility labels as described in this disclosure.

Still referring to FIG. 1, at least a sender possibility label may be stored in any suitable data and/or data type. For instance, and without limitation, at least a sender possibility label may include textual data, such as numerical, character, and/or string data. Textual data may include a standardized name and/or code for a characteristic, restriction, requirement, or the like; codes may include product codes, geographical codes, and/or industry codes, which may include without limitation codes used in classification systems. In general, there is no limitation on forms textual data or non-textual data used as at least a sender possibility label may take; persons skilled in the art, upon reviewing the entirety of this disclosure, will be aware of various forms which may be suitable for use as at least a sender possibility label consistently with this disclosure.

With continued reference to FIG. 1, in each first data element of first training set 110, at least a first sender possibility label 114 of the data element is correlated with at least an element of sender requirement label 112 of the data element. In an embodiment, an element of sender requirement label is correlated with a sender possibility label where the element of sender requirement label is located in the same data element and/or portion of data element as the sender possibility label; for example, and without limitation, an element of sender requirement label is correlated with a sender possibility element where both element of sender requirement label and sender possibility element are contained within the same first data element of the first training data set 110. As a further example, an element of sender requirement label is correlated with a sender possibility element where both share a category label as described in further detail below, where each is within a certain distance of the other within an ordered collection of data in data element, or the like. Still further, an element of sender requirement label may be correlated with a sender possibility label where the element of sender requirement label and the sender possibility label share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between sender requirement labels and sender possibility labels that may exist in first training set 110 and/or first data element consistently with this disclosure.

With continued reference to FIG. 1, system 100 may include a first label learner 116 operating on the carrier opportunity forecasting engine 108. The first label learner is designed and configured to generate a carrier opportunity output using the first training set 110 and the at least a sender database. First label learner 116 may include any hardware and/or software module. First label learner 116 is designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, first label learner 116 may be designed and configured to generate at least a carrier opportunity output. Generating the at least a carrier opportunity output may use, without limitation, the first machine-learning model 118; at least a first machine-learning model 118 may include one or more models that determine a mathematical relationship between sender possibility labels 112, sender request data from sender device 106, and/or sender database. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure. Machine-learning algorithms may generate carrier opportunity output as a function of first training data set 110, sender request data from sender device 109 and/or sender database.

Continuing to refer to FIG. 1, machine-learning algorithm used to generate first machine learning model 118 may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, first label learner 116 may generate carrier opportunity output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using first training set 110; the trained network may then be used to apply detected relationships between sender possibility labels 112, sender request data from sender device 106, and/or sender database.

With continued reference to FIG. 1, machine-learning algorithms may include unsupervised processes; unsupervised processes may, as a non-limiting example, be executed by an unsupervised learning module executing on carrier opportunity forecasting engine 108 and/or on another computing device in communication with carrier opportunity forecasting engine 108, which may include any hardware or software module. An unsupervised machine-learning process, as used herein, is a process that derives inferences in datasets without regard to labels; as a result, an unsupervised machine-learning process may be free to discover any structure, relationship, and/or correlation provided in the data. For instance, and without limitation, first label learner 116 and/or carrier opportunity forecasting engine 108 may perform an unsupervised machine learning process on first training set 110, which may cluster data of first training set 110 according to detected relationships between elements of the first training set 110, including, without limitation, correlations of elements of sender possibility labels 112 to each other, correlations of elements of sender request data to each other, and correlations of elements of sender database to each other; such relations may then be combined with supervised machine learning results to add new criteria for first label learner 116 to apply in relating sender possibility labels 112 to sender request data from sender device 106, and/or sender database. As a non-limiting, illustrative example, an unsupervised process may determine that a first element of sender request data acquired in a sender-input object detail datum correlates closely with a second element of sender request data, where the first element has been linked via supervised learning processes to a given sender possibility label, but the second has not; for instance, the second element may not have been defined as an input for the supervised learning process, or may pertain to a domain outside of a domain limitation for the supervised learning process. Continuing the example a close correlation between first element of sender request data acquired in a sender-input object detail datum and second element of sender request data from a sender device 106 may indicate that the second element is also a good resource for the sender possibility label; second element may be included in a new supervised process to derive a relationship or may be used as a synonym or proxy for the first element of sender request data by first label learner 116.

Still referring to FIG. 1, first label learner 116 may alternatively or additionally be designed and configured to generate at least a carrier opportunity output by executing a lazy learning process as a function of the first training set 110 and the at least a sender request data from sender device 106; lazy learning processes may be performed by a lazy learning module executing on carrier opportunity forecasting engine 108 and/or on another computing device in communication with carrier opportunity forecasting engine 108, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a sender possibility label associated with sender request data, using first training set 110. As a non-limiting example, an initial heuristic may include a ranking of sender possibility labels according to relation to an object detail datum and/or an object prospect datum; ranking may include, without limitation, ranking according to significance scores of associations between elements of sender request data and sender possibility labels, for instance as calculated as described above. Heuristic may include selecting some number of highest-ranking associations and/or sender possibility labels. First label learner 116 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate carrier opportunity outputs as described in this disclosure, including without limitation lazy learning applications of machine-learning algorithms as described in further detail below.

Continuing to refer to FIG. 1, carrier opportunity forecasting engine 108 may be designed and configured to transmit the carrier opportunity output to the at least a carrier device 104 utilizing first graphical user interface 120. Output first graphical user interface 120 may display the at least a carrier opportunity output to the carrier device 104.

In an embodiment, and still referring to FIG. 1, carrier opportunity forecasting engine 108 may be designed and configured to comprise sender requirement forecasting module 122. Sender requirement forecasting module 122 may be designed and configured to receive a third training data set including a plurality of third data entries, each third data entry of the plurality of third data entries including at least a carrier inclination label and at least a correlated sender request label; and create at least a third machine-learning model as a function the at least a third training set, carrier database, and the carrier capabilities data from the at least a carrier device. Sender requirement forecasting module 122 may be designed and/or configured to perform any method, method step, or sequence of method steps in any embodiment described in this disclosure, in any order and with any degree of repetition, as described above. Sender requirement forecasting module 122 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, system 100 includes a sender opportunity forecasting engine 124 operating on the at least a server 102, wherein the sender opportunity forecasting engine 124 is configured to receive a second training data set including a plurality of second training data entries, each second data entry of the plurality of second data entries including at least a carrier requirement label and at least a correlated carrier possibility label; generate a sender opportunity output using the second training set, and the at least a carrier database; and transmit the sender opportunity output to the at least a sender device. At least a server 102, sender opportunity forecasting engine 124, and/or one or more modules operating thereon may be designed and/or configured to perform any method, method step, or sequence of method steps in any embodiment described in this disclosure, in any order and with any degree of repetition. For instance, at least a server 102 and/sender opportunity forecasting engine 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. At least a server 102 and/or sender opportunity forecasting engine 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, sender opportunity forecasting engine 124 may be designed and configured to receive a second training set 126 including a plurality of second data entries, each second data entry of the second training set 126 including at least a carrier requirement label 128 and at least a correlated carrier possibility label 130. A carrier requirement label, as described herein, is an element of data identifying and/or describing requirements and/or needs a carrier need to satisfy to enable the object to be delivered; carrier requirements may be evaluated with regard to one or more measures of load and/or delivery specifications of a sender's object, one or more measures of sender availability, one or more measures of sender required credentials, one or more measures of sender object content limitations, and/or any measures of the sender useful for object transportation purposes. Carrier requirement label 128 may include, without limitation, object specifications, such as object dimensions, which may include the height and width of an object a sender desires to be delivered. Object specifications may further include without limitation the weight and/or weight distribution of an object. Object specifications may further include, without limitation, object configuration, such as the customized layout of the object to be delivered. Object specifications may include, without limitation, a size specification describing the size of the object to be transported, such as a height of the object, width of the object, weight of the object. Object specifications may include, without limitation, a configuration specification describing the configuration of the object and/or objects to be delivered, such as a description that each of the four ceramic plates packaged in the same container, the 12 fur coats to be transported are packaged separately, and the like. Object specifications may include, without limitation, a content description providing insight as to what the object being shipped includes, such as a warning that the contents are breakable, a notification that the object is a living organism, a notification that the content of the object includes a noisemaker, and the like. Object specifications may further include, without limitation, packaging materials, such as the material the object is packaged inside during physical transport of the object. Carrier requirement label 128 may include, without limitation, delivery details, such as a pickup location and a destination location for the object the sender desires to be delivered. Delivery details may further include, without limitation, sender availability, such as a range of time the sender is available to have the object picked up for delivery and/or a range of time the sender desires to have the object delivered to the destination. Carrier requirement label 128 may include, without limitation, required credentials, such as a notary, security clearance, ability to transport biohazards, confidentiality agreements, and the like. Required credentials may include, without limitation, a security clearance requirement of the carrier, such as the object to be transported required the carrier have a security clearance, and the like. Required credentials may include, without limitation, a license requirement of the carrier, such as the object to be transported requires the carrier have a gun license, medical license, commercial driving license, and the like. Required credentials may include, without limitation, a requirement for a confirmation signature from the carrier upon successful transportation, such as a sender may require the carrier receive a signature from the object recipient upon successful transport of the object. Examples of carrier requirement label 128 described in this disclosure are presented for illustrative purposes only and are not meant to be exhaustive. Persons skilled in the art, upon reviewing the entirety of this disclosure, will be aware of various additional examples of carrier requirement label 128 that may be used consistently with descriptions of systems and methods as provided in this disclosure.

With continued reference to FIG. 1, carrier requirement labels may include one or more sender-entered descriptions of requirements and/or needs a carrier need to satisfy to enable the object to be delivered. One or more sender-entered descriptions may include, without limitation, current or past object specifications, current or past delivery trip details, current or past sender required credentials, or any other sender-entered data that the sender may identify as a requirement, need, and/or restraint when delivering a given object. Carrier requirement labels may include any data suitable for use as sender request data received from one or more sender device 106, including, without limitation, at least an object detail datum and at least a carrier stipulation datum. Examples of carrier requirement label 128 described in this disclosure are presented for illustrative purposes only and are not meant to be exhaustive. Persons skilled in the art, upon reviewing the entirety of this disclosure, will be aware of various additional examples of carrier requirement label 128 that may be used consistently with descriptions of systems and methods as provided in this disclosure.

Continuing to refer to FIG. 1, each element of second training set 126 includes at least an element of carrier possibility label 130. A carrier possibility label, as described herein, is an element of data identifying and/or describing a current, incipient, or probable characteristic of a carrier; characteristics may include one or more features carrier must possess to enable object to be delivered. At least a carrier possibility label may be associated with object specifications, such as object dimensions, object weight, object configuration, packaging material, or any other specification associated with the placement of the object during transport that may be associated with one or more carrier requirement label 128. At least a carrier possibility label may be associated with geographical elements, such as carrier locations within a specified distance from an object and/or sender location or carrier destination within a specified distance from an object and/or sender destination, or any other geographical positioning element associated with one or more carrier requirement label 112 as described in further detail below. Characteristics associated with carrier possibility labels may include, without limitation, sender required credentials, defined for our purposes herein as accreditation necessary to properly deliver object. Required credentials may include, without limitation, security clearance, confidentiality requirements, medical license, confirmation signature, gun license, commercial driving license, notary, insurance, bloodborne pathogens personal protective equipment (PPE) training, or any other required credential as described herein. The above-described examples are presented for illustrative purposes only and are not intended to be exhaustive. Persons skilled in the art, upon reviewing the entirety of this disclosure, will be aware of various additional examples of characteristics that may be associated with carrier possibility labels as described in this disclosure.

Still referring to FIG. 1, at least a carrier possibility label may be stored in any suitable data and/or data type. For instance, and without limitation, at least a carrier possibility label may include textual data, such as numerical, character, and/or string data. Textual data may include a standardized name and/or code for a characteristic, restriction, requirement, or the like; codes may include product codes, geographical codes, and/or industry codes, which may include without limitation codes used in classification systems. In general, there is no limitation on forms textual data or non-textual data used as at least a sender possibility label may take; persons skilled in the art, upon reviewing the entirety of this disclosure, will be aware of various forms which may be suitable for use as at least a sender possibility label consistently with this disclosure.

With continued reference to FIG. 1, in each second data element of second training set 126, at least a first carrier possibility label 130 of the data element is correlated with at least an element of carrier requirement label 128 of the data element. In an embodiment, an element of carrier requirement label is correlated with a carrier possibility label where the element of carrier requirement label is located in the same data element and/or portion of data element as the carrier possibility label; for example, and without limitation, an element of carrier requirement label is correlated with a carrier possibility element where both element of carrier requirement label and carrier possibility element are contained within the same second data element of the second training data set 126. As a further example, an element of carrier requirement label is correlated with a carrier possibility element where both share a category label as described in further detail below, where each is within a certain distance of the other within an ordered collection of data in data element, or the like. Still further, an element of carrier requirement label may be correlated with a carrier possibility label where the element of carrier requirement label and the carrier possibility label share an origin, such as being data that was collected with regard to a single person or the like. In an embodiment, a first datum may be more closely correlated with a second datum in the same data element than with a third datum contained in the same data element;

for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between carrier requirement labels and carrier possibility labels that may exist in second training set 126 and/or second data element consistently with this disclosure.

With continued reference to FIG. 1, system 100 may include a second label learner 132 operating on the sender opportunity forecasting engine 124. The second label learner is designed and configured to generate a sender opportunity output using the second training set 126 and the at least a carrier database. Second label learner 132 may include any hardware and/or software module. Second label learner 132 is designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 1, second label learner 132 may be designed and configured to generate at least a sender opportunity output. Generating the at least a sender opportunity output may be generated according to any process, process steps, or combination of processes and/or process steps suitable for creation of carrier opportunity output using the first training set 110 and the at least a sender database.

Continuing to refer to FIG. 1, sender opportunity forecasting engine 124 may be designed and configured to transmit the sender opportunity output to the at least a sender device 106 utilizing second graphical user interface 136. Output second graphical user interface 136 may display the at least a sender opportunity output to the sender device 106.

In an embodiment, and still referring to FIG. 1, sender opportunity forecasting engine 124 may be designed and configured to comprise carrier requirement forecasting module 138. Carrier requirement forecasting module 138 may be designed and configured to receive a fourth training data set including a plurality of fourth data entries, each fourth data entry of the plurality of fourth data entries including at least a sender inclination label and at least a correlated carrier capabilities label; and create at least a fourth machine-learning model as a function the at least a fourth training set and the sender request data from the at least a sender device. Carrier requirement forecasting module 138 may be designed and/or configured to perform any method, method step, or sequence of method steps in any embodiment described in this disclosure, in any order and with any degree of repetition, as described above. Carrier requirement forecasting module 138 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referencing FIG. 1, system 100 may be designed and configured to include a sender qualification module 140 operating on the at least a server 102. Sender qualification module 140 may be designed and configured to identify at least a sender requirement label; and generate at least an applicable object output as a function of the first training data set and the carrier capabilities data. Sender qualification module 140 may be designed and/or configured to perform any method, method step, or sequence of method steps in any embodiment described in this disclosure, in any order and with any degree of repetition, as described above. Sender qualification module 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, system 100 may be designed and configured to include a carrier qualification module 142 operating on the at least a server 102. Carrier qualification module 142 may be designed and configured to identify at least a carrier requirement label; and generate at least an applicable carrier index output as a function of the second training data set and the sender request data. Carrier qualification module 142 may be designed and/or configured to perform any method, method step, or sequence of method steps in any embodiment described in this disclosure, in any order and with any degree of repetition, as described above. Carrier qualification module 142 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may be designed and configured to include an experience reflection module 144 operating on the at least a server 102. Experience reflection module 146 may be designed and configured to receive at least an execution datum from the at least a carrier device; transmit at least an object criterion to the at least a carrier device; transmit at least a carrier criterion to the at least a sender device; receive at least an element of object criterion datum from the at least a carrier device; and receive at least an element of carrier criterion datum from the at least a sender device. Experience reflection module 146 may be designed and/or configured to perform any method, method step, or sequence of method steps in any embodiment described in this disclosure, in any order and with any degree of repetition, as described above. Experience reflection module 146 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In some embodiments, system 100 may include initiating a transfer of monetary funds from a sender device 106 to a carrier device 104. Initiating a transfer is designed to receive an execution datum from at least a carrier device 104. An execution datum may include any element of data as described above in reference to FIG. 1-14. Initiating a transfer may further include transferring monetary funds from a sender device 106 to a carrier device 104. Monetary funds may be at least an item of use as a medium for exchange. Monetary funds may further comprise currencies that are legal tender, used in commerce and/or issued for commemorative purposes. Monetary funds may further comprise centrally controlled government-issued currencies and/or alternative currencies supported by private decentralized trust networks. Alternative currencies may include for example, and without limitation, virtual currencies, such as crypto currency. Alternative currencies may further include, without limitation, Bitcoin, Ethereum, Litecoin, Monero, Peercoin or Dogecoin, and/or any branded currencies.

In some embodiments, initiating a transfer of monetary funds may further include communication with a financial institution. A financial institution may further include, without limitation, a corporation that provides services as an intermediary of a financial market. A financial institution may further include, without limitation, a bank, a credit union, trust company, insurance company, brokerage firm, investment dealer, and/or any business with operations in the financial services sector. Transfer of monetary funds to carrier device 104 may further include, without limitation, transfer of an electronic check to carrier device 104. A financial institution may instruct an associated merchant bank to initiate an ACH pull transaction from the sender's account and transfer the funds to the account specified by the carrier in accordance with conventional ACH transactions between banks. In other cases, the ACH transaction may be initiated by the funds transfer system directly, without the use of a merchant bank. Transfer without the use of a merchant bank may further comprise third party check guarantors are used, such as funds may be delivered to carrier device 104 before being received from sender device 106. Persons skilled in the art, upon reviewing the entirety of this disclosure, will be aware of various ways in which monetary funds associated to a sender device may be transferred to a carrier device.

In some embodiments, initiating a transfer of monetary funds from a sender device to a carrier device may further include receiving user authentication credentials from a user. User authentication credentials may be an authentication datum supplied by user that aids in identifying user. An authentication datum may be a knowledge factor such as a password that only user knows and is able to enter when prompted. Other knowledge factors may include a passphrase and/or personal identification number (PIN). Authentication datum may also be a possession factor, whereby authentication is demonstrated when user proves possession, such as possession of a security token. Authenticating user identity may further comprise biometric authentication. Biometrics are distinctive, measurable characteristics used to identify individuals. Biometric authentication involves authentication by a unique biological pattern derived from a measurable biological characteristic of a biological sample of user.

In some embodiments, persons, devices, or transactions may be authenticated or assigned a confidence level using digital certificates. A confidence level, as used herein, is an element of data expressing a degree to which the safety, security, or authenticity of a process, device, or datum may be relied upon. As used herein, a confidence level may include a numerical score; numerical score may be a score on a scale having one extremum representing a maximal degree of reliability, and a second extremum representing a minimum degree of reliability.

In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. In other embodiments where trust in a single certificate authority is undesirable (e.g., where there is concern of the certificate authority and verifier colluding), the same functionality may be accomplished by a group of certificate authorities acting to authenticate in coordination, with the requirement that a threshold number of the group of certificate authorities, and/or a threshold proportion of the group of certificate authorities, agree (e.g. "threshold cryptography"); a confidence level in each certificate authority may be determined according to any method or means described herein for determination of a confidence level in any device or entity, including without limitation in a distributed storage node. In an embodiment, certificate authorities that have a confidence level below a given threshold level may be eliminated; in other embodiments, certificate authority confidence levels may be aggregated according to any method shown herein. Aggregate confidence level may be used for threshold cryptography as described above; for instance, agreeing certificate authorities may have an aggregate confidence level which must exceed a threshold, or aggregate confidence level of agreeing certificate authorities may be required to represent a threshold proportion of aggregate confidence level of all certificate authorities in group. Additional embodiments may include group signature schemes that issue certificates on a membership public key generated by a secure computing module as described in further detail below; in such scenarios, authentication may include proof by the secure computing module that the secure computing module possesses a secret key to a public key/certificate pair. Although digital signatures have been introduced here as performed using public key cryptographic systems, digital signatures may alternatively or additionally be performed using any non-interactive zero-knowledge proof; for instance, a proof may be recorded in conjunction with a datum, and a verification may be performed by any party seeking to evaluate the proof.

Figure 2:
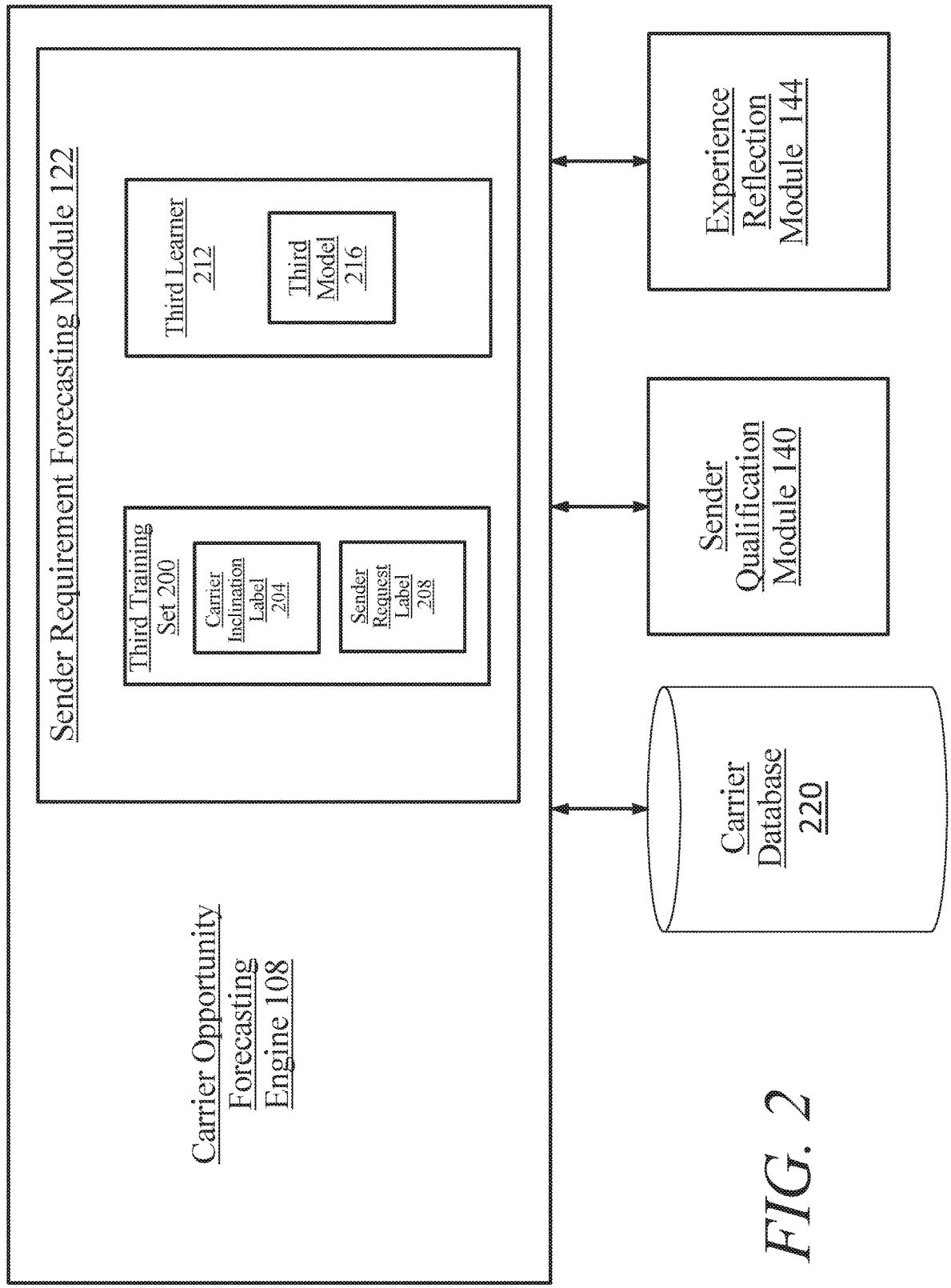
FIG. 2 is a schematic diagram illustrating an exemplary embodiment of a sender requirement forecasting module and associated system elements.

Referring now to FIG. 2, carrier opportunity forecasting engine 108 may be designed and configured to comprise sender requirement forecasting module 122. Sender requirement forecasting module 122 may be designed and configured to receive a third training data set including a plurality of third data entries, each third data entry of the plurality of third data entries including at least a carrier inclination label and at least a correlated sender request label; and create at least a third machine-learning model as a function of the at least a third training set, carrier database, and the carrier capabilities data from the at least a carrier device, wherein creating the third machine-learning model further comprises associating the at least a carrier capabilities data from the at least a carrier database and carrier inclination datum; and generating at least a sender requirement label by relating the carrier inclination datum and the third training data set. Sender requirement forecasting module 122 may be designed and/or configured to perform any method, method step, or sequence of method steps in any embodiment described in this disclosure, in any order and with any degree of repetition, as described above in reference to FIG. 1. Sender requirement forecasting module 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for the division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, sender requirement forecasting module 122 may be designed and configured to receive a third training set 200 including a plurality of third data entries, each third data entry of the plurality of third data entries including at least a carrier inclination label 204 and at least a correlated sender request label 208. A carrier inclination label, as described herein, is an element of data identifying and/or describing tendencies of particular characteristics or types of behavior of the carrier; carrier inclinations may be evaluated with regard to one or more measures of repeated behavior, one or more measure of repeated carrier capabilities data, such as upcoming trip datum and/or object detail datum for at least a carrier device. Carrier inclination label 204 may include, without limitation, object limitations, such as object requirements, which may limit the objects a carrier may transports. Object limitation may include, without limitation, a size limitation on what object will be able to fit in the carrier's mode of transportation, such as a carrier can only transport objects smaller than four feet wide by four feet tall. Object limitation may include, without limitation, a weight limitation on what object will fit into the carrier's mode of transportation, such as a carrier may only transport objects smaller than 90 lbs, and the like. Object limitation may include, without limitation, a contraband on specific articles, such as the carrier will not transport objects containing open liquid, no glass, no perishables, no living organisms, no object noise, no odor, no weaponry, no illegal narcotics and/or paraphernalia, object exceeding a monetary limit, and the like. and the like. Carrier inclination label 204 may include, without limitation, travel details, such as a location, and/or carrier availability. Travel details may include, without limitation, a carrier starting point, such as the location from which the carrier is starting the trip and will be able to pick up objects to deliver. Travel details may include, without limitation, a carrier ending point, such as the location with which the carrier determines to be the destination of the trip and will be able to deliver objects to. Travel details may include, without limitation, a distance the carrier is willing to deviate from the planned route, such as the carrier is willing to go 30 miles off route to deliver a package, carrier is willing to travel 15 minutes off the planned trip route to transport an object, and the like. Travel details may include, without limitation, a time the carrier is starting a trip and/or an ending time the carrier is planning to arrive at a destination, and the like. Carrier inclination label 204 may include, without limitation, travel details, such as a starting point and a destination, and/or carrier availability, such as a range of time the carrier is available to make deliveries. Carrier inclination label 204 may include, without limitation, carrier credentials, such as a notary, security clearance, ability to transport biohazards, confidentiality agreements, and the like. Carrier inclination label 204 may include, without limitation, object content limitations, such as constraints on the contents of the object to be transported, which may include no liquids, no glass, no perishables, no living organisms, noise, odor, weaponry, illegal narcotics and/or paraphernalia, a monetary limit and the like. Examples of carrier inclination label 204 described in this disclosure are presented for illustrative purposes only and are not meant to be exhaustive. Persons skilled in the art, upon reviewing the entirety of this disclosure, will be aware of various additional examples of carrier inclination label 204 that may be used consistently with descriptions of systems and methods as provided in this disclosure.

Continuing to refer to FIG. 2, each element of third training set 200 includes at least an element of sender request label 208. A sender request label, as described herein, is an element of data identifying and/or describing at least an object detail datum and/or at least a carrier stipulation datum. An object detail datum is an element of data identifying and/or describing specifications of the one or more object the sender desires to have delivered, as described above in reference to FIG. 1. A carrier stipulation input is an element of data identifying and/or describing qualifications of the carrier and/or carrier mode of transportation necessary to ensure proper object delivery, as described above in reference to FIG. 1.

Still referring to FIG. 2, at least a sender request label may be stored in any suitable data and/or data type. For instance, and without limitation, at least a sender request label may include textual data, such as numerical, character, and/or string data. Textual data may include a standardized name and/or code for a characteristic, restriction, requirement, or the like; codes may include product codes, geographical codes, and/or industry codes, which may include without limitation codes used in classification systems. In general, there is no limitation on forms textual data or non-textual data used as at least a sender request label may take; persons skilled in the art, upon reviewing the entirety of this disclosure, will be aware of various forms which may be suitable for use as at least a sender request label consistently with this disclosure.

With continued reference to FIG. 2, in each third data element of third training set 200, at least a first sender request label 208 of the data element is correlated with at least an element of carrier inclination label 204 of the data element. In an embodiment, an element of carrier inclination label is correlated with a sender request label where the element of carrier inclination label is located in the same data element and/or portion of data element as the sender request label; for example, and without limitation, an element of carrier inclination label is correlated with a sender request element where both element of carrier inclination label and sender request element are contained within the same third data element of the third training data set 200. As a further example, an element of carrier inclination label is correlated with a sender request element where both share a category label as described in further detail below, where each is within a certain distance of the other within an ordered collection of data in data element, or the like. Still further, an element of carrier inclination label may be correlated with a sender request label where the element of carrier inclination label and the sender request label share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between carrier inclination labels and sender request labels that may exist in third training set 200 and/or third data element consistently with this disclosure.

With continued reference to FIG. 2, system 100 may include a third label learner 212 operating on the sender requirement forecasting module 122. The third label learner 212 is designed and configured to create at least a third machine-learning model 216 as a function the at least a third training set, carrier database, and the carrier capabilities data from the at least a carrier device, wherein creating the third machine-learning model further comprises associating the at least a carrier capabilities data from the at least a carrier database and carrier inclination datum; and generating at least a sender requirement label by relating the carrier inclination datum and the third training data set. Third label learner 212 may include any hardware and/or software module. Third label learner 212 is designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

With continued reference to FIG. 2, machine-learning algorithms may generate sender requirement label as a function of classification of at least a carrier capabilities data stored in carrier database 220. Classification as used herein includes pairing or grouping carrier inclination labels as a function of a shared commonality. Classification may include for example, groupings, pairings, and/or trends between carrier device and current carrier capabilities data, future carrier capabilities data, and the like. In an embodiment, machine-learning algorithms may examine relationships between a future propensity of a carrier to develop a sender requirement label based on current carrier capabilities data and previous carrier capabilities data stored in carrier database 220. Machine-learning algorithms may include any and all algorithms as performed by any modules, described herein for third label learner 212. For example, and without limitation, machine-learning algorithms may relate a carrier's travel to Boston, Mass. every Sunday for three consecutive weeks to a carrier's future propensity to travel to Boston, Mass. the upcoming Sunday. Machine-learning algorithms may examine object size limitations and frequency of the limitation to develop a mode of transportation predictor. For example, machine-learning algorithms may examine a carrier's object limitation of less than three feet wide and three feet tall regularly Monday and Wednesday to determine the carrier's future propensity to use a smaller mode of transportation two days a week. Machine-learning algorithms may be grouped and implemented according to any of the methodologies as described below in reference to FIG. 14.

Still referring to FIG. 2, third label learner 212 may be designed and configured to generate at least a sender requirement label. Generating the at least a sender requirement label may be generated according to any process, process steps, or combination of processes and/or process steps suitable for creation of sender requirement label using the third training set 212 and the at least a carrier inclination datum.

With continued reference to FIG. 2, carrier opportunity forecasting engine 108 is configured to store each element of carrier capabilities data for each carrier device 104 within carrier database 220. Storage of each element of carrier capabilities data for each carrier device 104 is based on the input of the carrier capabilities data by at least a carrier device 104, as described above. Element of carrier capabilities data may include at least an upcoming trip datum and/or at least an object prospect datum, as described above in reference to FIG. 1. Persons skilled in the art, upon reviewing the entirety of this disclosure, will be aware of various additional examples for elements of carrier capabilities data that may be received from carrier device 104 consistently with this disclosure.

Figure 3:
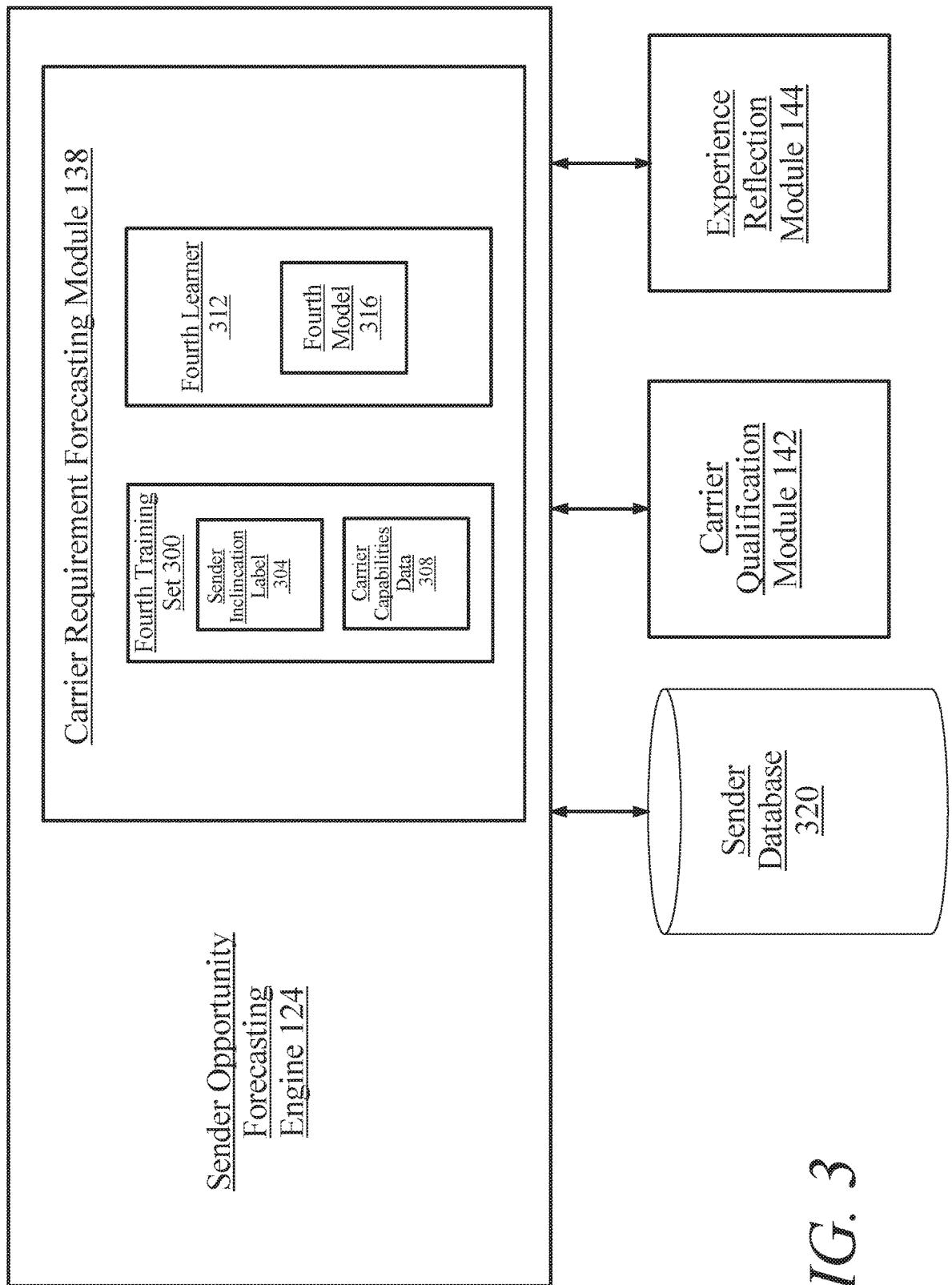
FIG. 3 is a schematic diagram illustrating an exemplary embodiment of a carrier requirement forecasting module and associated system elements.

Referring now to FIG. 3, sender opportunity forecasting engine 124 may be designed and configured to comprise carrier requirement forecasting module 138. Carrier requirement forecasting module 138 may be designed and configured to receive a fourth training data set including a plurality of fourth data entries, each fourth data entry of the plurality of fourth data entries including at least a sender inclination label and at least a correlated carrier capabilities label; and create at least a fourth machine-learning model as a function the at least a fourth training set and the sender request data from the at least a sender device, wherein creating the fourth machine-learning model further comprises associating the at least a sender request data from the at least a sender database and the sender inclination datum; and generating at least a carrier requirement label as a function of relating the sender inclination datum and the fourth training data set. Carrier requirement forecasting module 138 may be designed and/or configured to perform any method, method step, or sequence of method steps in any embodiment described in this disclosure, in any order and with any degree of repetition, as described above in reference to FIG. 1. Carrier requirement forecasting module 138 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 3, carrier requirement forecasting module 138 may be designed and configured to receive a fourth training set 300 including a plurality of fourth data entries, each fourth data entry of the plurality of fourth data entries including at least a sender inclination label 304 and at least a correlated carrier capabilities label 308. A sender inclination label, as described herein, is an element of data identifying and/or describing tendencies of particular characteristics or types of behavior of the sender; sender inclinations may be evaluated with regard to one or more measures of repeated behavior, one or more measure of repeated sender request data, such as object at least a detail datum and/or at least a carrier stipulation datum from sender device 106. Sender inclination label 304 without limitation, object specifications, such as object dimensions, object configuration, and the like. Object specifications may include, without limitation, a size specification describing the size of the object to be transported, such as a height of the object, width of the object, weight of the object. Object specifications may include, without limitation, a configuration specification describing the configuration of the object and/or objects to be delivered, such as a description that each of the four ceramic plates packaged in the same container, the 12 fur coats to be transported are packaged separately, and the like. Object specifications may include, without limitation, a content description providing insight as to what the object being shipped includes, such as a warning that the contents are breakable, a notification that the object is a living organism, a notification that the content of the object includes a noisemaker, and the like. Object specifications may further include, without limitation, packaging materials, such as the material the object is packaged inside during physical transport of the object. Sender inclination label 304 may include, without limitation, delivery details, such as a pickup location and a destination location for the object the sender desires to be delivered. Delivery details may further include, without limitation, sender availability, such as a range of time the sender is available to have the object picked up for delivery and/or a range of time the sender desires to have the object delivered to the destination. Sender inclination label 304 may include, without limitation, sender required credentials, such as a notary, security clearance, ability to transport biohazards, confidentiality agreements, and the like. Sender required credentials may include, without limitation, a security clearance requirement of the carrier, such as the object to be transported required the carrier have a security clearance, and the like. Sender required credentials may include, without limitation, a license requirement of the carrier, such as the object to be transported requires the carrier have a gun license, medical license, commercial driving license, and the like. Sender required credentials may include, without limitation, a requirement for a confirmation signature from the carrier upon successful transportation, such as a sender may require the carrier receive a signature from the object recipient upon successful transport of the object. Examples of sender inclination label 304 described in this disclosure are presented for illustrative purposes only and are not meant to be exhaustive. Persons skilled in the art, upon reviewing the entirety of this disclosure, will be aware of various additional examples of sender inclination label 304 that may be used consistently with descriptions of systems and methods as provided in this disclosure.

Continuing to refer to FIG. 3, each element of fourth training set 300 includes at least an element of carrier capabilities label 308. A carrier capabilities label, as described herein, is an element of data identifying and/or describing at least an upcoming trip datum and/or at least an object prospect datum. An upcoming trip datum is an element of data identifying and/or describing particulars of a planned future travel for a carrier, as described above in reference to FIG. 1. An object prospect datum is an element of data identifying and/or describing specifications of the one or more object the carrier is able to deliver, as described above in reference to FIG. 1.

Still referring to FIG. 3, at least a carrier capabilities label may be stored in any suitable data and/or data type. For instance, and without limitation, at least a carrier capabilities label may include textual data, such as numerical, character, and/or string data. Textual data may include a standardized name and/or code for a characteristic, restriction, requirement, or the like; codes may include product codes, geographical codes, and/or industry codes, which may include without limitation codes used in classification systems. In general, there is no limitation on forms textual data or non-textual data used as at least a carrier capabilities label may take; persons skilled in the art, upon reviewing the entirety of this disclosure, will be aware of various forms which may be suitable for use as at least a carrier capabilities label consistently with this disclosure.

With continued reference to FIG. 3, in each fourth data element of fourth training set 300, at least a first carrier capabilities label 308 of the data element is correlated with at least an element of sender inclination label 304 of the data element. In an embodiment, an element of sender inclination label is correlated with a carrier capabilities label where the element of sender inclination label is located in the same data element and/or portion of data element as the carrier capabilities label; for example, and without limitation, an element of sender inclination label is correlated with a carrier capabilities element where both element of sender inclination label and carrier capabilities element are contained within the same fourth data element of the fourth training data set 300. As a further example, an element of sender inclination label is correlated with a carrier capabilities element where both share a category label as described in further detail below, where each is within a certain distance of the other within an ordered collection of data in data element, or the like. Still further, an element of sender inclination label may be correlated with a carrier capabilities label where the element of sender inclination label and the carrier capabilities label share an origin, such as being data that was collected with regard to a single person or the like. In an embodiment, a first datum may be more closely correlated with a second datum in the same data element than with a third datum contained in the same data element;

for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between sender inclination labels and carrier capabilities labels that may exist in fourth training set 300 and/or fourth data element consistently with this disclosure.

With continued reference to FIG. 3, system 100 may include a fourth label learner 312 operating on the carrier requirement forecasting module 138. The fourth label learner 312 is designed and configured to create at least a fourth machine-learning model as a function the at least a fourth training set and the sender request data from the at least a sender device, wherein creating the fourth machine-learning model further comprises associating the at least a sender request data from the at least a sender database and the sender inclination datum; and generating at least a carrier requirement label as a function of relating the sender inclination datum and the fourth training data set. Fourth label learner 312 may include any hardware and/or software module. Fourth label learner 312 is designed and configured to generate outputs using machine learning processes. A machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

With continued reference to FIG. 3, machine-learning algorithms may generate carrier requirement label as a function of classification of at least a sender request data stored in sender database 320. Classification as used herein includes pairing or grouping sender inclination labels as a function of a shared commonality. Classification may include for example, groupings, pairings, and/or trends between sender device and current sender request data, future sender request data, and the like. In an embodiment, machine-learning algorithms may examine relationships between a future propensity of a sender to develop a carrier requirement label based on current sender request data and previous sender request data stored in sender database 320. Machine-learning algorithms may include any and all algorithms as performed by any modules, described herein for fourth label learner 312. For example, and without limitation, machine-learning algorithms may relate a sender's request to deliver an object to Denver, Colo. every Thursday for four consecutive weeks to a sender's future propensity to deliver an object to Denver, Colo. the upcoming Thursday. Machine-learning algorithms may examine object size specifications and frequency of the specification to develop an item and delivery date predictor. For example, machine-learning algorithms may examine a carrier's object specifications of 10.25 inches tall and 5.5 inches wide Monday and Wednesday to determine the sender's future propensity to request delivery of a gallon of milk the upcoming Monday and Wednesday. Machine-learning algorithms may be grouped and implemented according to any of the methodologies as described below in reference to FIG. 14.

Still referring to FIG. 3, fourth label learner 312 may be designed and configured to generate at least a carrier requirement label. Generating the at least a carrier requirement label may be generated according to any process, process steps, or combination of processes and/or process steps suitable for creation of carrier requirement label using the fourth training set 312 and the at least a sender inclination datum.

With continued reference to FIG. 3, sender opportunity forecasting engine 124 is configured to store each element of sender request data for each sender device 106 within sender database 320. Storage of each element of sender request data for each sender device 106 is based on the input of the sender request data by at least a sender device 106, as described above. Element of sender request data may include at least an object detail datum and/or at least a carrier stipulation datum, as described above in reference to FIG. 1. Persons skilled in the art, upon reviewing the entirety of this disclosure, will be aware of various additional examples for elements of sender request data that may be received from sender device 106 consistently with this disclosure.

Figure 4:
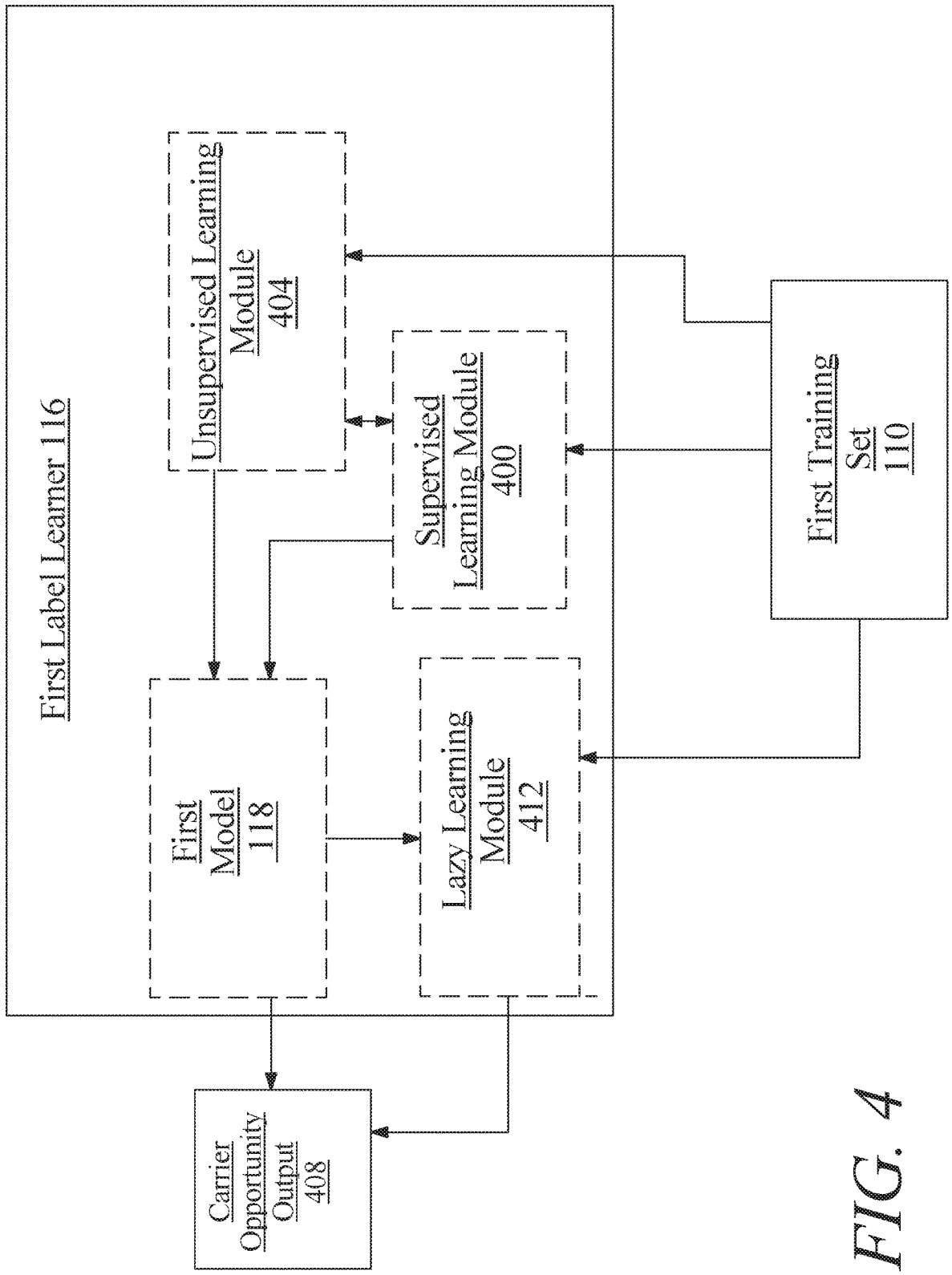
FIG. 4 is a block diagram illustrating an exemplary embodiment of a first label learner and associated system elements.

Referring now to FIG. 4, an exemplary embodiment of first label learner is illustrated. Machine-learning algorithms used by first label learner 116 may include supervised machine-learning algorithms, which may, as a non-limiting example be executed using a supervised learning module 400 executing on at least a carrier opportunity forecasting engine 108 operating on at least a server 102, which may include any hardware or software module. Supervised machine learning algorithms include algorithms that receive a training set relating a number of inputs to a number of outputs and seek to find one or more mathematical relations relating inputs to outputs, as described above in reference to FIG. 1.

With continued reference to FIG. 4, machine-learning algorithms may include unsupervised processes; unsupervised processes may, as a non-limiting example, be executed by an unsupervised learning module 404 executing on at least a carrier opportunity forecasting engine 108 operating on at least a server 102, which may include any hardware or software module. An unsupervised machine-learning process is a process that derives inferences in datasets without regard to labels, as described above in reference to FIG. 1.

Still referring to FIG. 4, first label learner 116 may alternatively or additionally be designed and configured to generate at least a carrier opportunity output 408 by executing a lazy learning process as a function of the first training set 110 and/or sender request data; lazy learning processes may be performed by a lazy learning module 412 executing on at least a carrier opportunity forecasting engine 108 operating on at least a server 102, which may include any hardware or software module. A lazy-learning process and/or protocol, may be a process whereby machine learning is conducted upon receipt of an input to be converted to an output, by combining the input and training set to derive the algorithm to be used to produce the output on demand, as described above in reference to FIG. 1.

Figure 5:
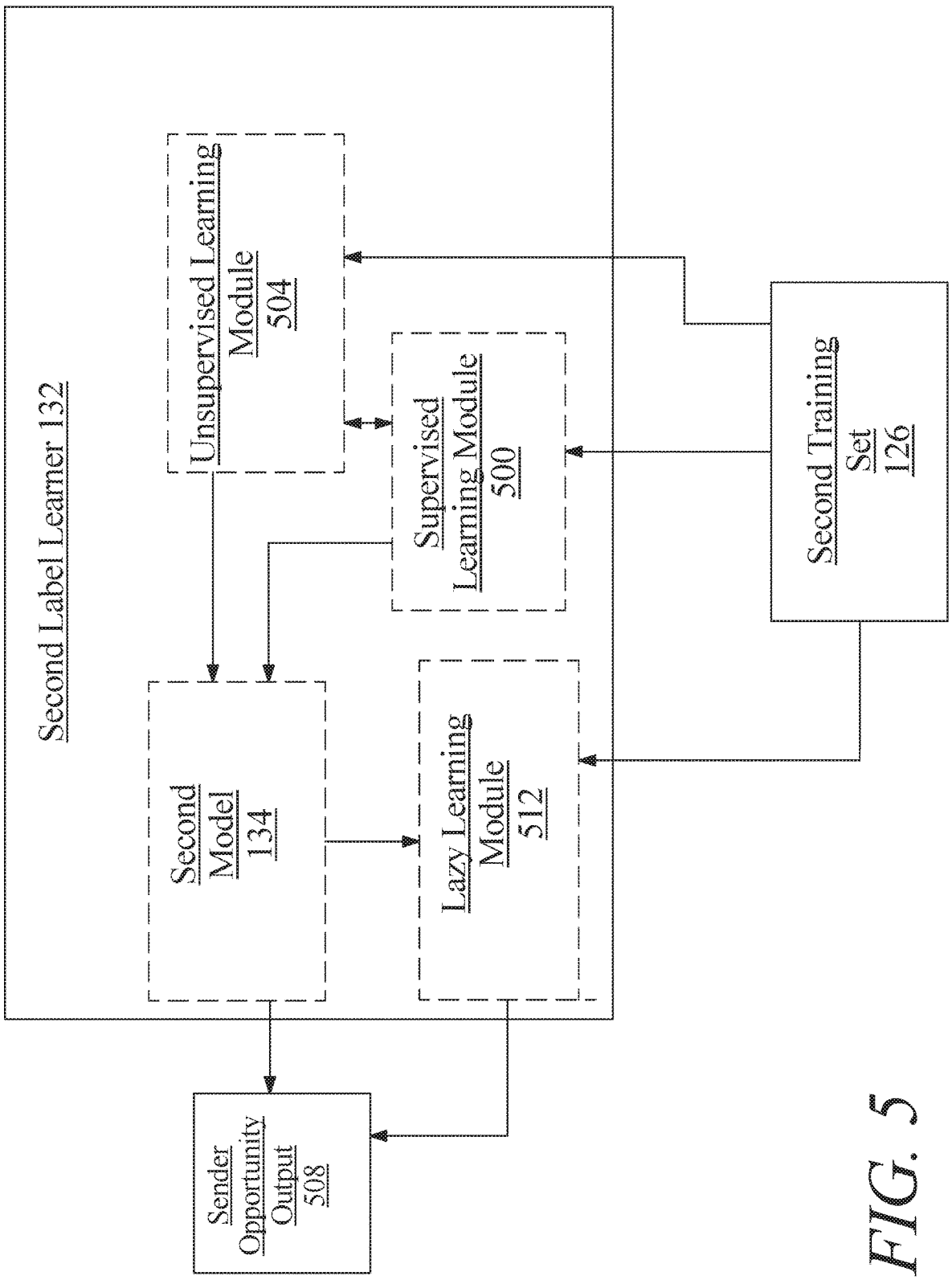
FIG. 5 is a block diagram illustrating an exemplary embodiment of a second label learner and associated system elements.

Referring now to FIG. 5, an exemplary embodiment of second label learner is illustrated. Machine-learning algorithms used by second label learner 132 may include supervised machine-learning algorithms, which may, as a non-limiting example be executed using a supervised learning module 500 executing on at least a sender opportunity forecasting engine 124 operating on at least a server 102, which may include any hardware or software module. Supervised machine learning algorithms include algorithms that receive a training set relating a number of inputs to a number of outputs and seek to find one or more mathematical relations relating inputs to outputs, as described above in reference to FIG. 1.

With continued reference to FIG. 5, machine-learning algorithms may include unsupervised processes; unsupervised processes may, as a non-limiting example, be executed by an unsupervised learning module 504 executing on at least a sender opportunity forecasting engine 124 operating on at least a server 102, which may include any hardware or software module. An unsupervised machine-learning process is a process that derives inferences in datasets without regard to labels, as described above in reference to FIG. 1.

Still referring to FIG. 5, first label learner 116 may alternatively or additionally be designed and configured to generate at least a sender opportunity output 508 by executing a lazy learning process as a function of the second training set 126 and/or carrier capabilities data; lazy learning processes may be performed by a lazy learning module 512 executing on at least a sender opportunity forecasting engine 124 operating on at least a server 102, which may include any hardware or software module. A lazy-learning process and/or protocol, may be a process whereby machine learning is conducted upon receipt of an input to be converted to an output, by combining the input and training set to derive the algorithm to be used to produce the output on demand, as described above in reference to FIG. 1.

Figure 6:
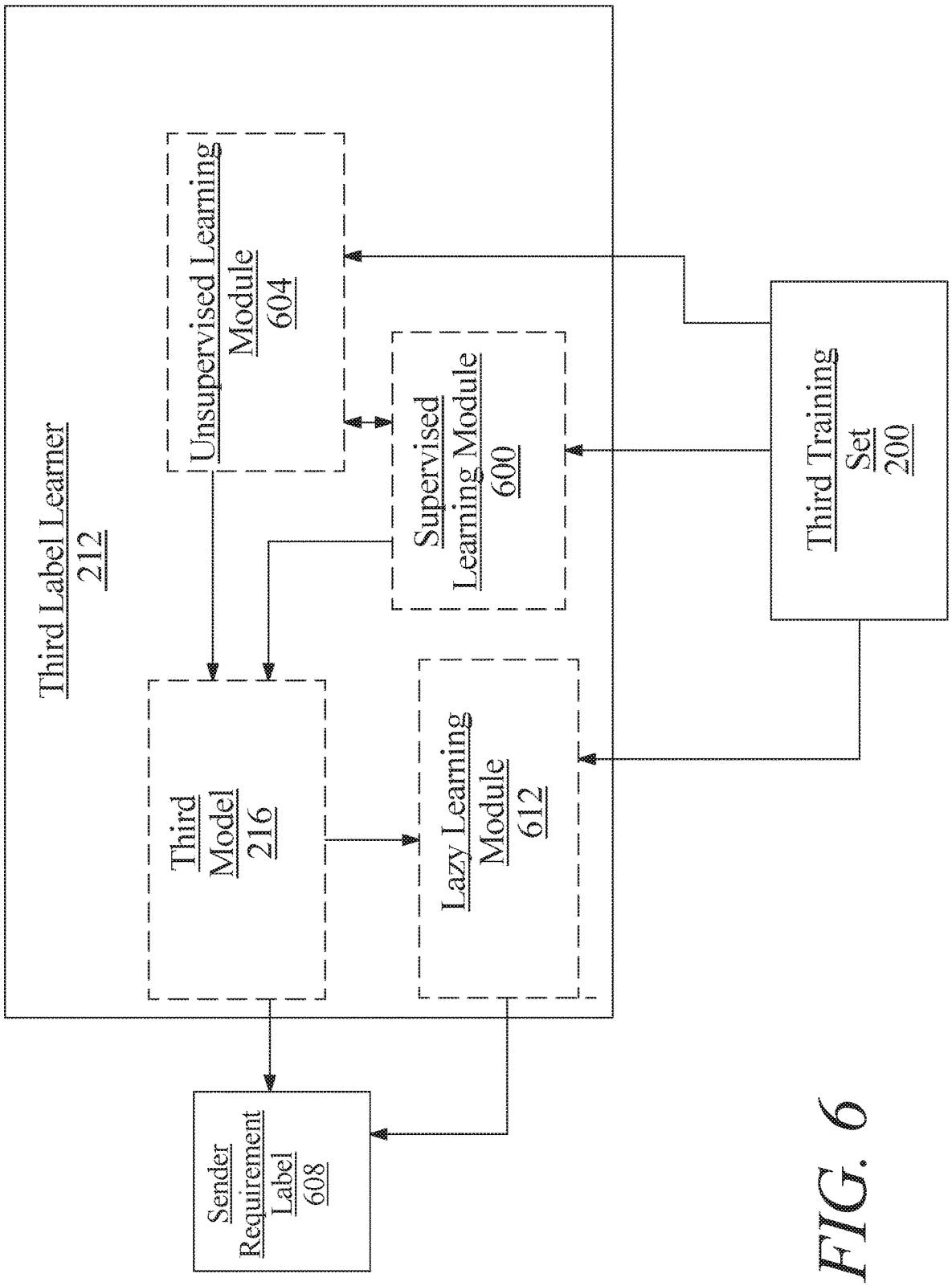
FIG. 6 is a block diagram illustrating an exemplary embodiment of a third label learner and associated system elements.

Referring now to FIG. 6, an exemplary embodiment of third label learner is illustrated. Machine-learning algorithms used by third label learner 212 may include supervised machine-learning algorithms, which may, as a non-limiting example be executed using a supervised learning module 600 executing on the at least a sender requirement forecasting module 122 operating on the at least a carrier opportunity forecasting engine 108, which may include any hardware or software module. Supervised machine learning algorithms include algorithms that receive a training set relating a number of inputs to a number of outputs and seek to find one or more mathematical relations relating inputs to outputs, as described above in reference to FIGS. 1-2.

With continued reference to FIG. 6, machine-learning algorithms may include unsupervised processes; unsupervised processes may, as a non-limiting example, be executed by an unsupervised learning module 604 executing on the at least a sender requirement forecasting module 122 operating on the at least a carrier opportunity forecasting engine 108, which may include any hardware or software module. An unsupervised machine-learning process is a process that derives inferences in datasets without regard to labels, as described above in reference to FIGS. 1-2.

Still referring to FIG. 6, third label learner 212 may alternatively or additionally be designed and configured to generate at least a sender requirement label 608 by executing a lazy learning process as a function of the third training set 200 and/or carrier inclination datum; lazy learning processes may be performed by a lazy learning module 612 executing on the at least a sender requirement forecasting module 122 operating on the at least a carrier opportunity forecasting engine 108, which may include any hardware or software module. A lazy-learning process and/or protocol, may be a process whereby machine learning is conducted upon receipt of an input to be converted to an output, by combining the input and training set to derive the algorithm to be used to produce the output on demand, as described above in reference to FIGS. 1-2.

Figure 7:
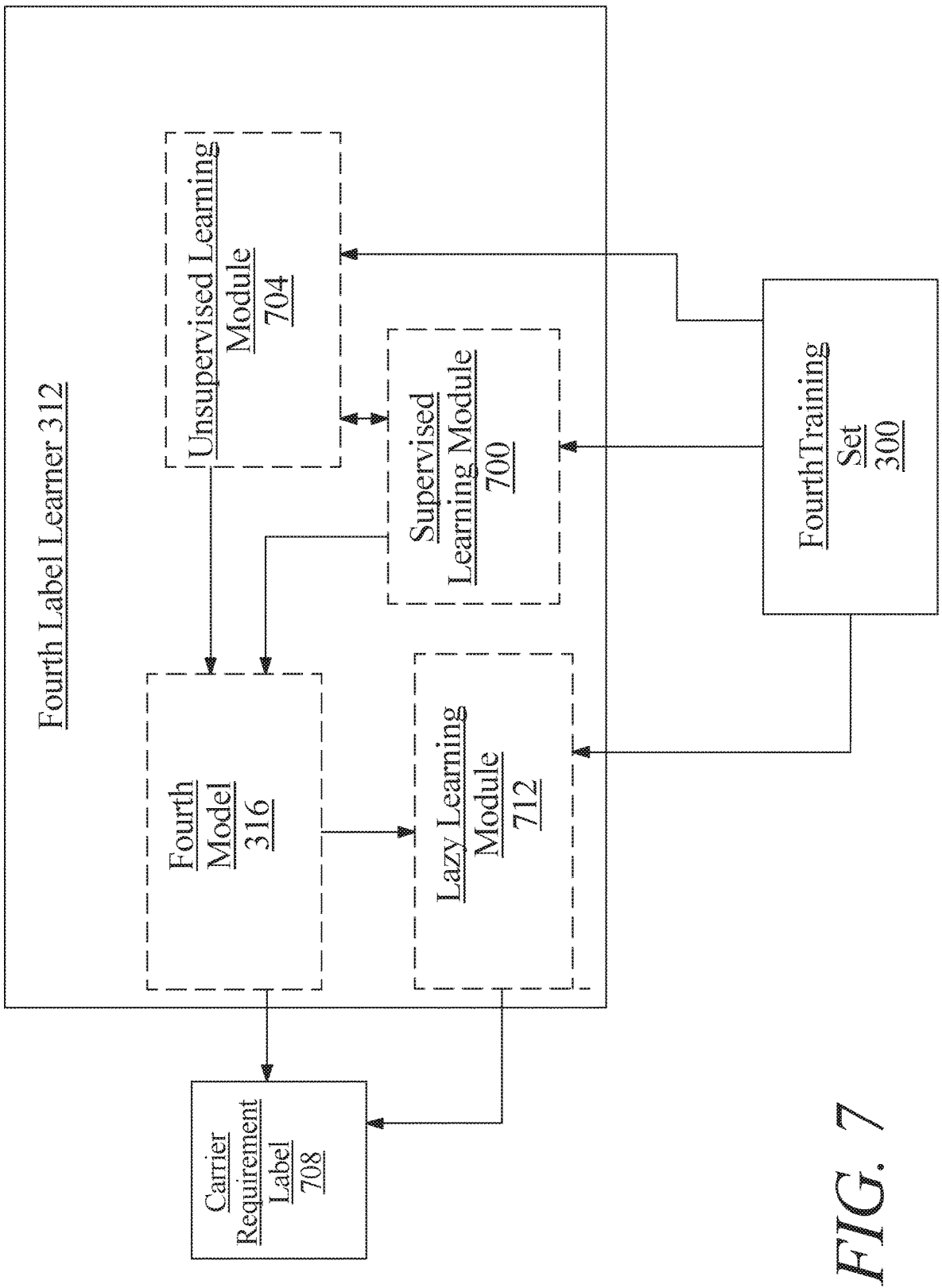
FIG. 7 is a block diagram illustrating an exemplary embodiment of a fourth label learner and associated system elements.

Referring now to FIG. 7, an exemplary embodiment of fourth label learner is illustrated. Machine-learning algorithms used by fourth label learner 312 may include supervised machine-learning algorithms, which may, as a non-limiting example be executed using a supervised learning module 700 executing on the at least a carrier requirement forecasting module 138 operating on the at least a sender opportunity forecasting engine 124, which may include any hardware or software module. Supervised machine learning algorithms include algorithms that receive a training set relating a number of inputs to a number of outputs and seek to find one or more mathematical relations relating inputs to outputs, as described above in reference to FIGS. 1-3.

With continued reference to FIG. 7, machine-learning algorithms may include unsupervised processes; unsupervised processes may, as a non-limiting example, be executed by an unsupervised learning module 704 executing on the at least a carrier requirement forecasting module 138 operating on the at least a sender opportunity forecasting engine 124, which may include any hardware or software module. An unsupervised machine-learning process is a process that derives inferences in datasets without regard to labels, as described above in reference to FIGS. 1-3.

Still referring to FIG. 7, fourth label learner 312 may alternatively or additionally be designed and configured to generate at least a carrier requirement label 708 by executing a lazy learning process as a function of the fourth training set 300 and/or sender inclination datum; lazy learning processes may be performed by a lazy learning module 712 executing on the at least a carrier requirement forecasting module 138 operating on the at least a sender opportunity forecasting engine 124, which may include any hardware or software module. A lazy-learning process and/or protocol, may be a process whereby machine learning is conducted upon receipt of an input to be converted to an output, by combining the input and training set to derive the algorithm to be used to produce the output on demand, as described above in reference to FIGS. 1-3.

Figure 8:
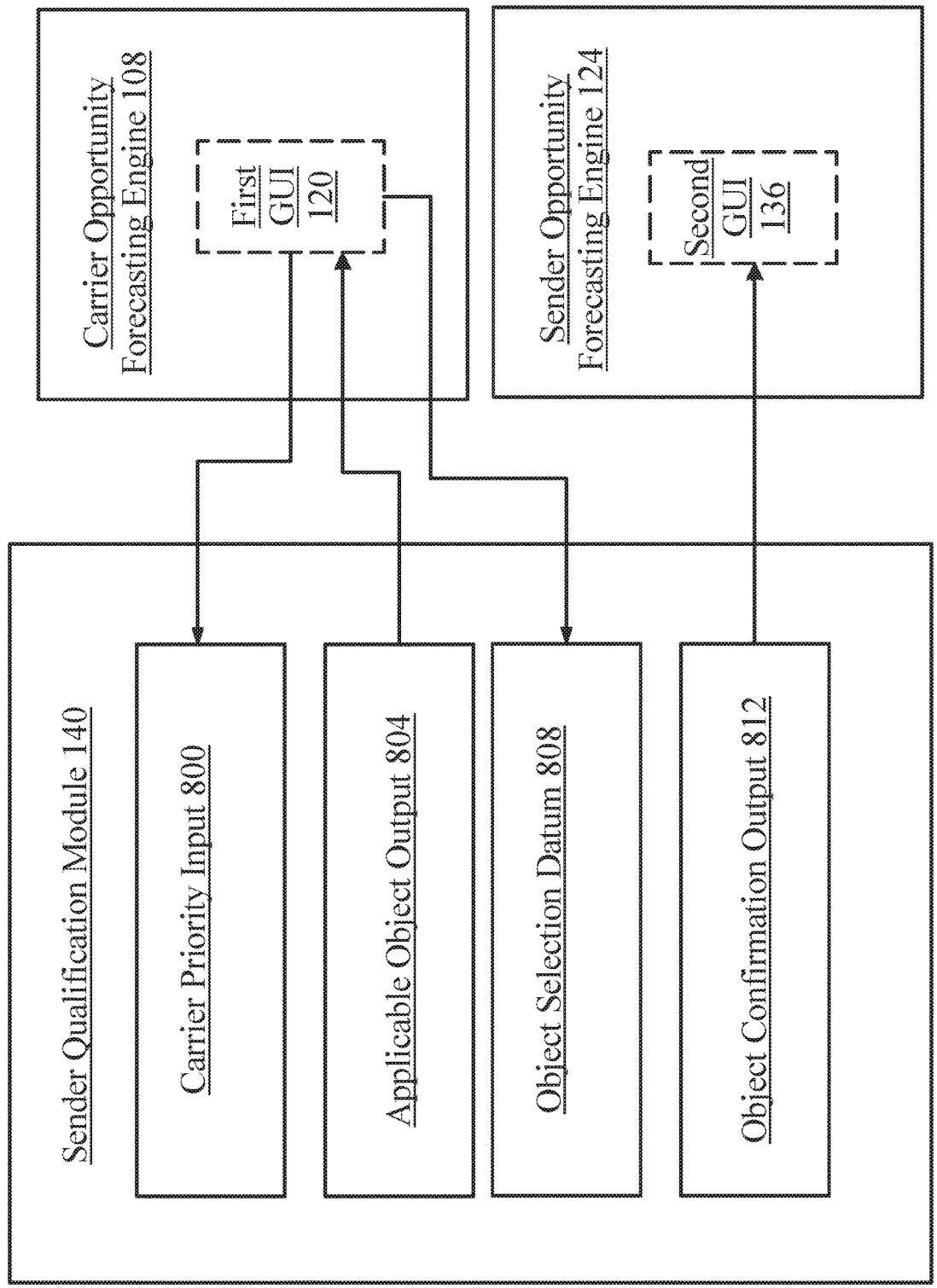
FIG. 8 is a schematic diagram illustrating an exemplary embodiment of a sender qualification module and associated system elements.

[sender qual module] Referring now to FIG. 8, an exemplary embodiment of sender qualification module 140, as pictured in FIG. 1, is illustrated in detail. Sender qualification module 140 may be designed and configured to identify at least a sender requirement label; and generate at least an applicable object output as a function of the first training data set and the carrier capabilities data. Sender qualification module 140 may be designed and/or configured to perform any method, method step, or sequence of method steps in any embodiment described in this disclosure, in any order and with any degree of repetition, as described above in reference to FIG. 1. Sender qualification module 140 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 8, sender qualification module 140 may generate at least an applicable object output by generating a loss function of user specific variables and minimizing the loss function. In an embodiment, sender qualification module 140 may compare one or more carrier priority input 800 to a mathematical expression representing an optimal combination of user entered variables. Mathematical expression may include a linear combination of variables, weighted by coefficients representing relative importance of each variable in generating an optimal provider instruction set and an optimal physical performance instruction set. For instance, a variable such as time of delivery may be multiplied by a first coefficient representing the importance of time of delivery, a second variable such as carrier vehicle size options may be multiplied by a second coefficient representing the importance of carrier vehicle size options, a degree of variance from a carrier opportunity output may be represented as another parameter, which may be multiplied by an additional coefficient representing an importance of that variable; persons skilled in the art, upon reviewing the entirety of this disclosure, will be aware of different variables that may be weighted by various coefficients. Use of a linear combination is provided only as an illustrative example; other mathematical expressions may alternatively or additionally be used, including without limitation higher-order polynomial expressions or the like.

With continued reference to FIG. 8, mathematical expression may represent a loss function, where a "loss function" is an expression of an output of which an optimization algorithm minimizes to generate an optimal result. As a non-limiting example, sender qualification module 140 may calculate variables of each of a carrier priority input 800 received from at least a carrier device and each of the at least a carrier opportunity output, calculate an output of mathematical expression using the variables, and select a carrier opportunity output that produces an output having the lowest size, according to a given definition of "size" of the set of outputs representing each of the plurality of provider instruction set and physical performance instruction sets; size may, for instance, include absolute value, numerical size, or the like. Selection of different loss functions may result in identification of different provider instruction sets and physical performance instruction sets as generating minimal outputs; for instance, where total time to delivery is associated in a first loss function with a large coefficient or weight, a total time to delivery having a shorter time to delivery may minimize the first loss function, whereas a second loss function wherein total time to delivery has a smaller coefficient but degree of variance from carrier vehicle size has a larger coefficient may produce a minimal output for a different carrier opportunity output and having a longer total time to delivery but more closely hewing to carrier vehicle size.

Alternatively or additionally, and still referring to FIG. 8, each carrier priority input 800 and each carrier opportunity output may be represented by a mathematical expression having the same form as mathematical expression; sender qualification module 140 may compare the former to the latter using an error function representing average difference between the two mathematical expressions. Error function may, as a non-limiting example, be calculated using the average difference between coefficients corresponding to each variable. Provider instruction set and physical performance instruction set having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers.

Still referring to FIG. 8, sender qualification module 140 may be designed and configured to receive carrier priority output 800 from the at least a carrier device 104 utilizing first graphical user interface 120, as described above. Input first graphical user interface 120 may receive the at least a carrier priority input 800 from the carrier device 104. For instance, and without limitation, first graphical user interface 120 may provide a carrier with carrier priority input 800; carrier priority input 800 may include a set of sliders or other user inputs permitting a user to indicate relative and/or absolute importance of each variable to the user. Sliders or other inputs maybe initialized prior to user entry as equal or may be set to default values based on results of any machine-learning processes or combinations thereof as described in further detail above.

With continued reference to FIG. 8, mathematical expression and/or loss function may be generated using a machine learning to produce loss function: i.e., regression. Mathematical expression and/or loss function be user-specific, using a training set composed of past user selections; may be updated continuously. Mathematical expression and/or loss function may initially be seeded using one or more user entries as above. User may enter a new command changing mathematical expression, and then subsequent user selections may be used to generate a new training set to modify the new expression.

Continuing to refer to FIG. 8, sender qualification module 140 may be further designed and configured to transmit the at least an applicable object output 804 to the at least a carrier device. An applicable object output 804, as described herein, is an element of data identifying and/or describing the object most likely to satisfy the carrier's requirements; applicable object output may be evaluated with regard to one or more measures of carrier capabilities data and/or any other measure of carrier request. Applicable object output 804 may include, without limitation, an output to a carrier device identifying and/or describing an object and/or sender most closely related to the carrier capabilities data for each carrier device. An applicable object output 804 may include, without limitation, a single object and/or sender most closely related to the carrier's carrier capability data, such as the output including one item for delivery. An applicable object output 804 may include, without limitation, multiple objects and/or senders most closely relating to the carrier's carrier capability data, such as an output including a list of multiple items for delivery.

Still referring to FIG. 8, sender qualification module 140 may be designed and configured to transmit applicable object output 804 to the at least a carrier device 104 utilizing first graphical user interface 120, as described above. Output first graphical user interface 120 may transmit the at least an applicable object output 804 to the carrier device 104.

Still referring to FIG. 8, sender qualification module 140 may be further designed and configured to receive at least an object selection datum 808 from the at least a carrier device wherein the at least an object selection datum 808 contains the at least a sender request datum from the at least a sender device. An object selection datum 808, as described herein, is an element of data identifying and/or describing the object in which the carrier has selected to deliver. Object selection datum 808 may include, without limitation, an input from a carrier device identifying and/or describing an object and/or sender the carrier has committed to executing delivery for. An object selection datum 808 may include, without limitation, a single object and/or sender in which the carrier has selected to deliver, such as the output including one item for the carrier has selected to deliver. An object selection datum 808 may include, without limitation, multiple objects and/or senders in which the carrier has selected to deliver, such as an output including a list of multiple items the carrier has selected to deliver. An object selection datum 808 may include, without limitation, an identifier of the sender request data and/or sender associated to the object the carrier has selected to deliver.

Still referring to FIG. 8, sender qualification module 140 may be designed and configured to receive object selection datum 808 from the at least a carrier device 104 utilizing first graphical user interface 120, as described above. Input first graphical user interface 120 may receive the at least an object selection datum 808 from the carrier device 104.

With continued reference to FIG. 8, sender qualification module 140 may be further designed and configured to transmit at least an object confirmation output 812 to the at least a sender device associated to the at least a sender request datum. An object confirmation output 812, as described herein, is an element of data identifying and/or describing the sender's request for delivery has been accepted by a carrier. Object confirmation output 812 may include, without limitation, an output to a carrier device identifying and/or describing to the sender that the sender request data will be satisfied. An object confirmation output 812 may include, without limitation, a single object in which the sender has requested to deliver, and carrier will satisfy, such as the output including one item the of the sender request the carrier will successfully deliver. An object confirmation output 812 may include, without limitation, multiple objects in which the sender has requested to deliver, and carrier will satisfy, such as an output including a list of multiple items the carrier has selected to deliver for the specific sender.

Still referring to FIG. 8, sender qualification module 140 may be designed and configured to transmit object confirmation output 812 to the at least a sender device 106 utilizing second graphical user interface 136, as described above. Output second graphical user interface 136 may transmit the at least an object confirmation output 812 to the sender device 106.

Figure 9:
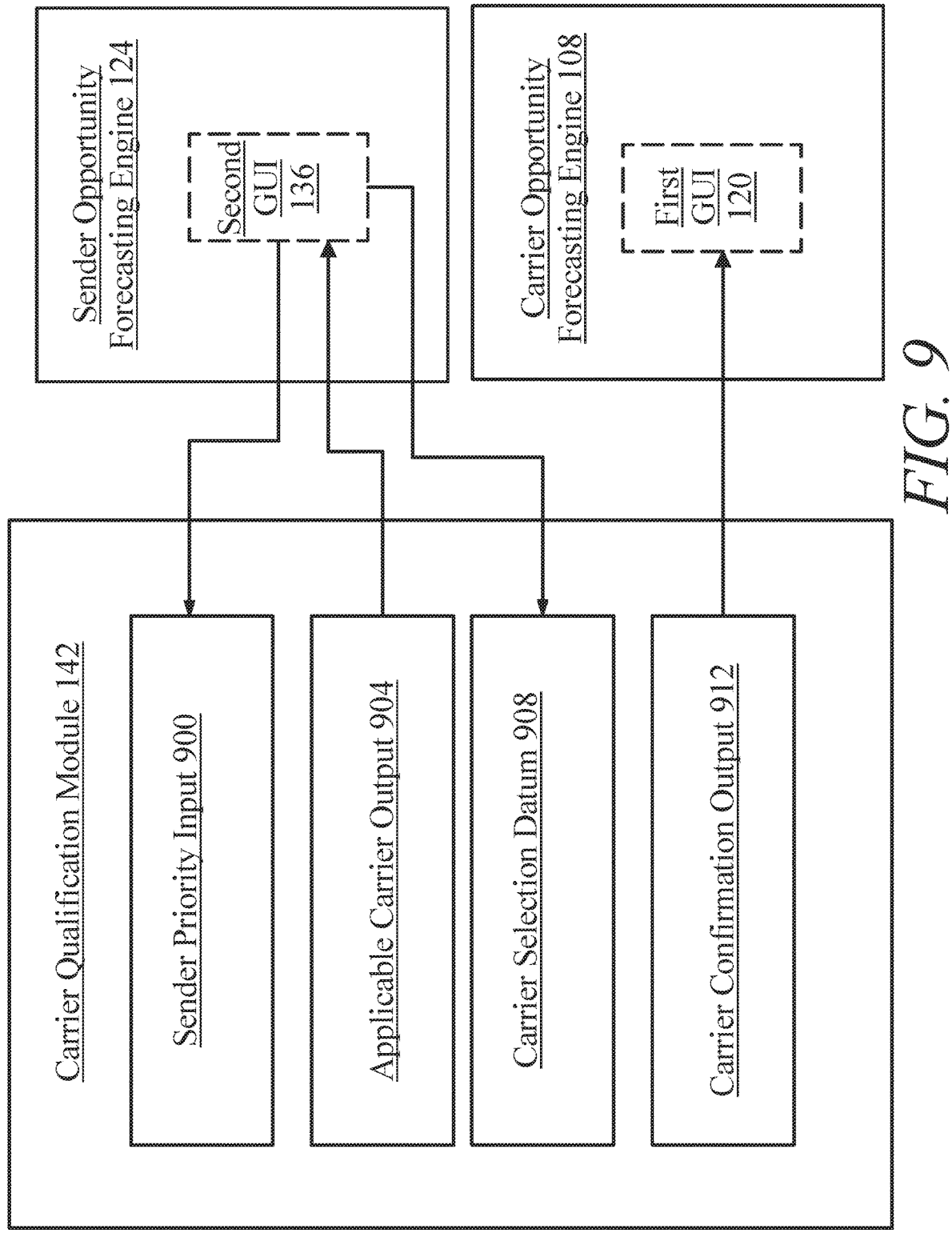
FIG. 9 is a schematic diagram illustrating an exemplary embodiment of a carrier qualification module and associated system elements.

Referring now to FIG. 9, an exemplary embodiment of carrier qualification module 142, as pictured in FIG. 1, is illustrated in detail. Carrier qualification module 142 may be designed and configured to identify at least a carrier requirement label; and generate at least an applicable carrier index output as a function of the second training data set and the sender request data. Carrier qualification module 142 may be designed and/or configured to perform any method, method step, or sequence of method steps in any embodiment described in this disclosure, in any order and with any degree of repetition, as described above in reference to FIG. 1. Carrier qualification module 142 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 9, carrier qualification module 142 may generate at least an applicable object output by generating a loss function of user specific variables and minimizing the loss function. In an embodiment, carrier qualification module 142 may compare one or more sender priority input 900 to a mathematical expression representing an optimal combination of user entered variables. Mathematical expression may include a linear combination of variables, weighted by coefficients representing relative importance of each variable in generating an optimal provider instruction set and an optimal physical performance instruction set. For instance, a variable such as time of delivery may be multiplied by a first coefficient representing the importance of time of delivery, a second variable such as object dimensions may be multiplied by a second coefficient representing the importance of object dimensions, a degree of variance from a sender opportunity output may be represented as another parameter, which may be multiplied by an additional coefficient representing an importance of that variable; persons skilled in the art, upon reviewing the entirety of this disclosure, will be aware of different variables that may be weighted by various coefficients. Use of a linear combination is provided only as an illustrative example; other mathematical expressions may alternatively or additionally be used, including without limitation higher-order polynomial expressions or the like.

With continued reference to FIG. 9, mathematical expression may represent a loss function, where a "loss function" is an expression of an output of which an optimization algorithm minimizes to generate an optimal result. As a non-limiting example, carrier qualification module 142 may calculate variables of each of a sender priority input 900 received from at least a sender device and each of the at least a sender opportunity output, calculate an output of mathematical expression using the variables, and select a sender opportunity output that produces an output having the lowest size, according to a given definition of "size" of the set of outputs representing each of the plurality of provider instruction set and physical performance instruction sets; size may, for instance, include absolute value, numerical size, or the like. Selection of different loss functions may result in identification of different sender opportunity outputs as generating minimal outputs; for instance, where time of delivery is associated in a first loss function with a large coefficient or weight, a time of delivery having a shorter time of delivery may minimize the first loss function, whereas a second loss function wherein time of delivery has a smaller coefficient but degree of variance from object dimensions has a larger coefficient may produce a minimal output for a different sender opportunity output and having a longer time of delivery but more closely hewing to object dimensions.

Alternatively or additionally, and still referring to FIG. 9, each sender priority input 900 and each sender opportunity output may be represented by a mathematical expression having the same form as mathematical expression; carrier qualification module 142 may compare the former to the latter using an error function representing average difference between the two mathematical expressions. Error function may, as a non-limiting example, be calculated using the average difference between coefficients corresponding to each variable. Provider instruction set and physical performance instruction set having a mathematical expression minimizing the error function may be selected, as representing an optimal expression of relative importance of variables to a system or user. In an embodiment, error function and loss function calculations may be combined; for instance, a variable resulting in a minimal aggregate expression of error function and loss function, such as a simple addition, arithmetic mean, or the like of the error function with the loss function, may be selected, corresponding to an option that minimizes total variance from optimal variables while simultaneously minimizing a degree of variance from a set of priorities corresponding to variables. Coefficients of mathematical expression and/or loss function may be scaled and/or normalized; this may permit comparison and/or error function calculation to be performed without skewing by varied absolute quantities of numbers.

Still referring to FIG. 9, carrier qualification module 142 may be designed and configured to receive sender priority output 900 from the at least a sender device 106 utilizing second graphical user interface 126, as described above. Input second graphical user interface 136 may receive the at least a sender priority input 900 from the sender device 106. For instance, and without limitation, second graphical user interface 136 may provide a sender with sender priority input 900; sender priority input 900 may include a set of sliders or other user inputs permitting a user to indicate relative and/or absolute importance of each variable to the user. Sliders or other inputs maybe initialized prior to user entry as equal or may be set to default values based on results of any machine-learning processes or combinations thereof as described in further detail above.

With continued reference to FIG. 9, mathematical expression and/or loss function may be generated using a machine learning to produce loss function: i.e., regression. Mathematical expression and/or loss function be user-specific, using a training set composed of past user selections; may be updated continuously. Mathematical expression and/or loss function may initially be seeded using one or more user entries as above. User may enter a new command changing mathematical expression, and then subsequent user selections may be used to generate a new training set to modify the new expression.

Continuing to refer to FIG. 9, carrier qualification module 142 may be further designed and configured to transmit the at least an applicable carrier output 904 to the at least a sender device. An applicable sender output 904, as described herein, is an element of data identifying and/or describing the carrier most likely to satisfy the sender's requirements; applicable carrier output may be evaluated with regard to one or more measures of sender request data and/or any other measure of sender request. Applicable sender output 904 may include, without limitation, an output to a sender device identifying and/or describing a carrier most closely related to the sender request data for each sender device. An applicable sender output 904 may include, without limitation, a single carrier most closely related to the sender's sender request data, such as the output including one carrier option to deliver the item. An applicable sender output 904 may include, without limitation, multiple carriers most closely relating to the sender's sender request data, such as an output including a list of multiple carriers able to deliver the item.

Still referring to FIG. 9, carrier qualification module 142 may be designed and configured to transmit applicable carrier output 904 to the at least a sender device 106 utilizing second graphical user interface 136, as described above. Output second graphical user interface 136 may transmit the at least an applicable carrier output 904 to the sender device 106.

Still referring to FIG. 9, carrier qualification module 142 may be further designed and configured to receive at least a carrier selection datum 908 from the at least a sender device wherein the at least a carrier selection datum 908 contains the at least a carrier capabilities datum from the at least a carrier device. A carrier selection datum 908, as described herein, is an element of data identifying and/or describing the carrier in which the sender has selected to deliver object. Carrier selection datum 908 may include, without limitation, an input from a sender device identifying and/or describing a carrier the sender has committed to executing delivery of object. A carrier selection datum 908 may include, without limitation, a single carrier in which the sender has selected to deliver object, such as the output including one carrier in which the sender has selected to deliver object. A carrier selection datum 908 may include, without limitation, an identifier of the carrier capabilities data and/or carrier device associated to the carrier the sender has selected to deliver object.

Still referring to FIG. 9, carrier qualification module 142 may be designed and configured to receive carrier selection datum 908 from the at least a sender device 106 utilizing second graphical user interface 136, as described above. Input second graphical user interface 136 may receive the at least a carrier selection datum 908 from the sender device 106.

With continued reference to FIG. 9, carrier qualification module 142 may be further designed and configured to transmit at least a carrier confirmation output 912 to the at least a carrier device associated to the at least a carrier capabilities datum. A carrier confirmation output 912, as described herein, is an element of data identifying and/or describing the carrier's request for delivery has been accepted by a sender. Carrier confirmation output 912 may include, without limitation, an output to a sender device identifying and/or describing to the carrier that the carrier capabilities data will be satisfied. A carrier confirmation output 912 may include, without limitation, a single delivery in which the carrier has requested to deliver, and sender will satisfy, such as the output including one item the of the carrier capabilities data the sender will successfully provide an item for delivery. An carrier confirmation output 912 may include, without limitation, multiple deliveries in which the carrier has requested to deliver, and carrier will satisfy, such as an output including a list of multiple item the of the carrier capabilities data the sender will successfully provide an item for delivery.

Still referring to FIG. 9, carrier qualification module 142 may be designed and configured to transmit carrier confirmation output 912 to the at least a carrier device 104 utilizing first graphical user interface 120, as described above. Output first graphical user interface 120 may transmit the at least a carrier confirmation output 912 to the carrier device 104.

Figure 10:
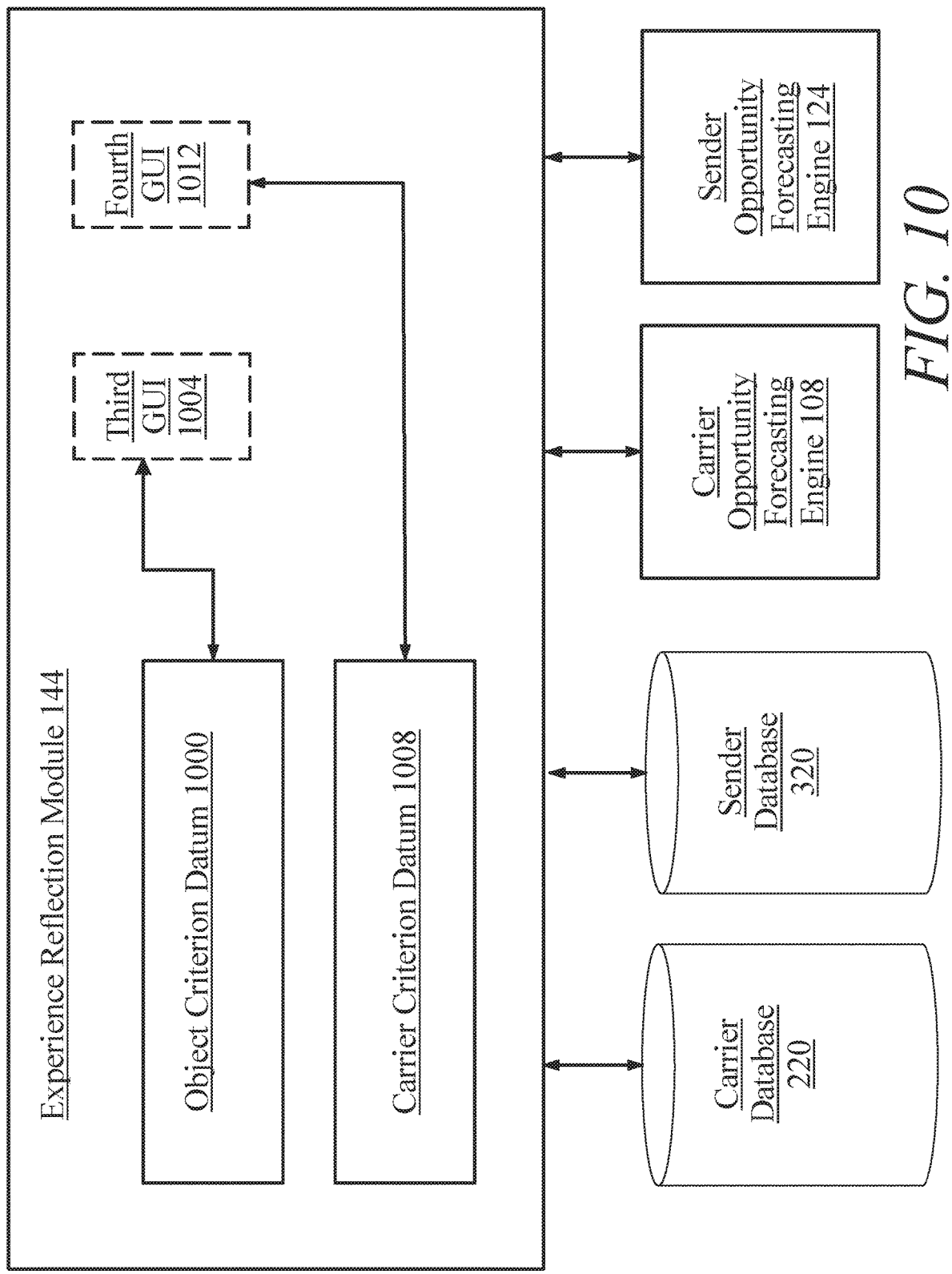
FIG. 10 is a schematic diagram illustrating an exemplary embodiment of an experience reflection module and associated system elements.

Referring now to FIG. 10, an exemplary embodiment of an experience reflection module 144, as pictured in FIG. 1, is illustrated in detail. Experience reflection module 144 may be designed and configured to receive at least an execution datum from the at least a carrier device; transmit at least an object criterion to the at least a carrier device; transmit at least a carrier criterion to the at least a sender device; receive at least an element of object criterion datum from the at least a carrier device; and receive at least an element of carrier criterion datum from the at least a sender device. Experience reflection module 144 may be designed and/or configured to perform any method, method step, or sequence of method steps in any embodiment described in this disclosure, in any order and with any degree of repetition, as described above in reference to FIG. 1. Experience reflection module 144 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 10, experience reflection module 144 may be designed and configured to receive at least an execution datum from the at least a carrier device. An execution datum, as described herein, is an element of data identifying and/or describing completion of the sender requested delivery of at least an object; execution datum may be evaluated with regard to one or more measures of sender request fulfillment, one or more measure of trip execution and/or any other measure of delivery fulfillment. Execution datum may include, without limitation, an input from a carrier device identifying and/or describing sender fulfillment, such as an input when the object has been put into the sender requested location. Execution datum may include, without limitation, an input from a carrier device identifying and/or describing carrier trip details having been executed, such as a geographical location of the carrier device matching the sender request data object delivery location.

With continued reference to FIG. 10, experience reflection module 144 may be designed and configured to transmit at least an object criterion datum 1000 to the at least a carrier device and receive at least a returned element of object criterion datum 1000 from the at least a carrier device. An object criterion datum, as described herein, is an element of data identifying and/or describing a carrier's assessment of the delivery experience of the specific object associated with a sender device. Object criterion datum may include, without limitation, a carrier questionnaire asking for a scored feedback of the object and/or sender for which the delivery took place. Object criterion datum may include, without limitation, a carrier input identifying and/or describing the experience and/or delivery of the object. Object criterion datum may include, without limitation, a carrier input identifying and/or describing the experience and/or interactions with the sender, such as assessment of the communications between the at least a carrier and the at least a sender.

Continuing to refer to FIG. 10, experience reflection module 144 may be designed and configured to transmit at least an object criterion datum 1000 to the at least a carrier device utilizing third graphical user interface 1004. Output third graphical user interface 1004 may display the at least an object criterion datum 1000 to the carrier device 104.

With continued reference to FIG. 10, experience reflection module 144 may be designed and configured to transmit at least a carrier criterion datum 1008 to the at least a sender device and receive at least a returned element of carrier criterion datum 1008 from the at least a sender device. A carrier criterion datum, as described herein, is an element of data identifying and/or describing a sender's assessment of the delivery experience of the object utilizing a specific carrier. Carrier criterion datum may include, without limitation, a sender questionnaire asking for a scored feedback of the carrier for which the delivery took place. Carrier criterion datum may include, without limitation, a sender input identifying and/or describing the experience and/or delivery of the object with the specific carrier. Carrier criterion datum may include, without limitation, a sender input identifying and/or describing the experience and/or interactions with the carrier, such as assessment of the communications between the at least a sender and the at least a carrier.

Continuing to refer to FIG. 10, experience reflection module 144 may be designed and configured to transmit at least a carrier criterion datum 1008 to the at least a sender device utilizing fourth graphical user interface 1012. Output fourth graphical user interface 1012 may display the at least a carrier criterion datum 1008 to the sender device 106.

Figure 11:
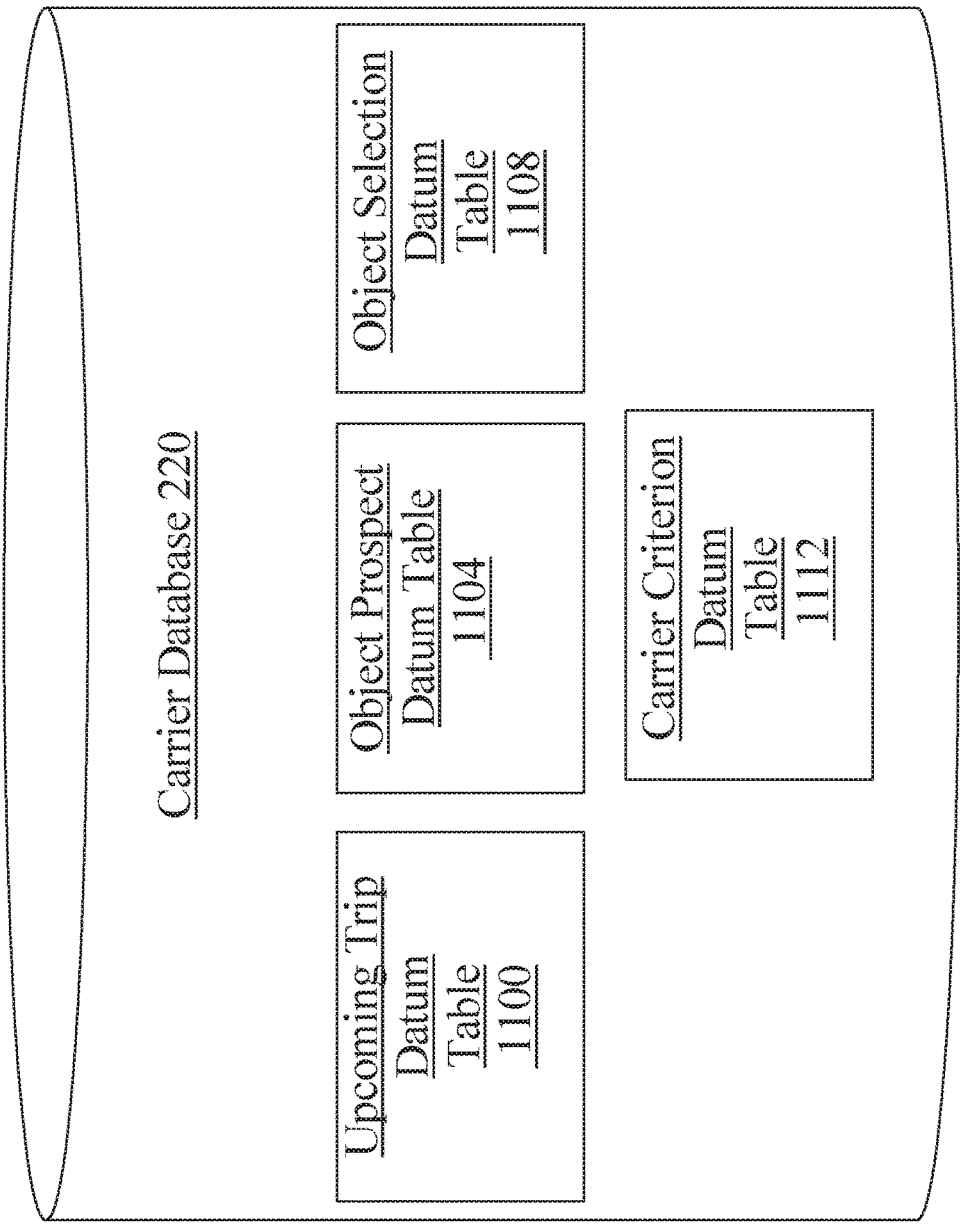
FIG. 11 is a depiction of an exemplary embodiment of a carrier database in accordance with the instant disclosure.

Referring now to FIG. 11, an exemplary embodiment of carrier database 220 is illustrated. Carrier database 220 may include any data structure for ordered storage and retrieval of data, which may be implemented as a hardware or software module. Carrier database 220 may be implemented, without limitation, as a relational database, a key-value retrieval datastore such as a NOSQL database, or any other format or structure for use as a datastore that a person skilled in the art would recognize as suitable upon review of the entirety of this disclosure. Carrier database 220 may include a plurality of data entries and/or records corresponding to elements of carrier capabilities data, as described above. Data entries and/or records may describe, without limitation, data concerning upcoming trip datum and object prospect datum. Carrier database 220 may further include a plurality of data entries and/or records corresponding to object selection datum, as described above in reference to FIG. 8. Carrier database 220 may further include a plurality of data entries and/or records corresponding to carrier criterion datum, as described above in reference to FIG. 10.

Still referring to FIG. 11, one or more database tables in carrier database 220 may include, as a non-limiting example, an upcoming trip datum table 1100. Upcoming trip datum table 1100 may be a table storing and/or matching upcoming trip datum from each element of carrier capabilities data to each carrier device. For instance, and without limitation, carrier database 220 may include an upcoming trip datum table 1100 listing samples acquired from each element of carrier capabilities data for each carrier device 104 generated in carrier opportunity forecasting engine 108, such as an element of upcoming trip datum.

Continuing to refer to FIG. 11, one or more database tables in carrier database 220 may include, as a non-limiting example, an object prospect datum table 1104. Object prospect datum table 1104 may be a table storing and/or matching object prospect datum from each element of carrier capabilities data to each carrier device. For instance, and without limitation, carrier database 220 may include an object prospect datum table 1104 listing samples acquired from each element of carrier capabilities data for each carrier device 104 generated in carrier opportunity forecasting engine 108, such as an element of object prospect datum.

Still referring to FIG. 11, one or more database tables in carrier database 220 may include, as a non-limiting example, an object selection datum table 1108. Object selection datum table 1108 may be a table storing and/or matching an element object selection datum to each carrier device. For instance, and without limitation, carrier database 220 may include an object selection datum table 1108 listing samples acquired from each element object selection datum for each carrier device 104 generated in sender qualification module 140, such as an element of object selection datum.

With continued reference to FIG. 11, one or more database tables in carrier database 220 may include, as a non-limiting example, a carrier criterion datum table 1112. Carrier criterion datum table 1112 may be a table storing and/or matching an element of carrier criterion datum to each carrier device. For instance, and without limitation, carrier database 220 may include a carrier criterion datum table 1112 listing samples acquired from each element of carrier criterion datum associated to each carrier device 104 received from each sender device 106 in experience reflection module 144, such as an element of carrier criterion datum. Tables presented above are presented for exemplary purposes only; persons skilled in the art will be aware of various ways in which data may be organized in carrier database 220 consistently with this disclosure.

Figure 12:
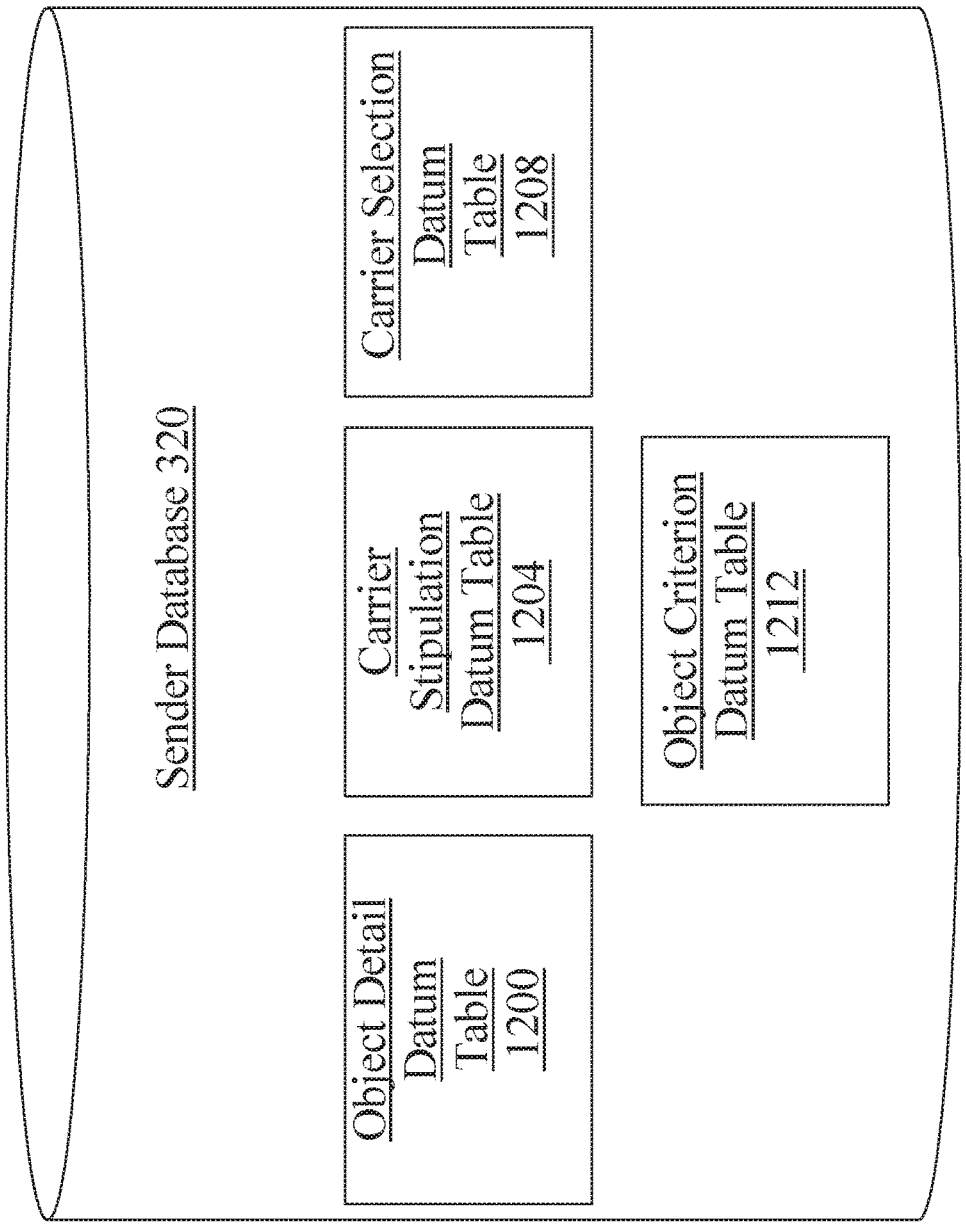
FIG. 12 is a depiction of an exemplary embodiment of a sender database in accordance with the instant disclosure.

Referring now to FIG. 12, an exemplary embodiment of sender database 320 is illustrated. Sender database 320 may include any data structure for ordered storage and retrieval of data, which may be implemented as a hardware or software module. Sender database 320 may be implemented, without limitation, as a relational database, a key-value retrieval datastore such as a NOSQL database, or any other format or structure for use as a datastore that a person skilled in the art would recognize as suitable upon review of the entirety of this disclosure. Sender database 320 may include a plurality of data entries and/or records corresponding to elements of sender request data, as described above. Data entries and/or records may describe, without limitation, data concerning object detail datum and carrier stipulation datum. Sender database 320 may further include a plurality of data entries and/or records corresponding to carrier selection datum, as described above in reference to FIG. 9. Sender database 320 may further include a plurality of data entries and/or records corresponding to object criterion datum, as described above in reference to FIG. 10.

Still referring to FIG. 12, one or more database tables in sender database 320 may include, as a non-limiting example, an object detail datum table 1200. Object detail datum table 1200 may be a table storing and/or matching object detail datum from each element of sender request data to each sender device. For instance, and without limitation, sender database 320 may include an object detail datum table 1200 listing samples acquired from each element of sender request data for each sender device 106 generated in sender opportunity forecasting engine 124, such as an element of object detail datum.

Continuing to refer to FIG. 12, one or more database tables in sender database 320 may include, as a non-limiting example, a carrier stipulation datum table 1204. Carrier stipulation datum table 1204 may be a table storing and/or matching carrier stipulation datum from each element of sender request data to each sender device. For instance, and without limitation, sender database 320 may include a carrier stipulation datum table 1204 listing samples acquired from each element of sender request data for each sender device 106 generated in sender opportunity forecasting engine 124, such as an element of carrier stipulation datum.

Still referring to FIG. 12, one or more database tables in sender database 320 may include, as a non-limiting example, a carrier selection datum table 1208. Carrier selection datum table 1208 may be a table storing and/or matching an element carrier selection datum to each sender device. For instance, and without limitation, sender database 320 may include a carrier selection datum table 1208 listing samples acquired from each element of carrier selection datum for each sender device 106 generated in carrier qualification module 142, such as an element of carrier selection datum.

With continued reference to FIG. 12, one or more database tables in sender database 320 may include, as a non-limiting example, an object criterion datum table 1212. Object criterion datum table 1212 may be a table storing and/or matching an element of object criterion datum to each sender device. For instance, and without limitation, sender database 320 may include an object criterion datum table 1212 listing samples acquired from each element of object criterion datum associated to each sender device 106 received from each carrier device 104 in experience reflection module 144, such as an element of object criterion datum. Tables presented above are presented for exemplary purposes only; persons skilled in the art will be aware of various ways in which data may be organized in sender database 320 consistently with this disclosure.

Figure 13:
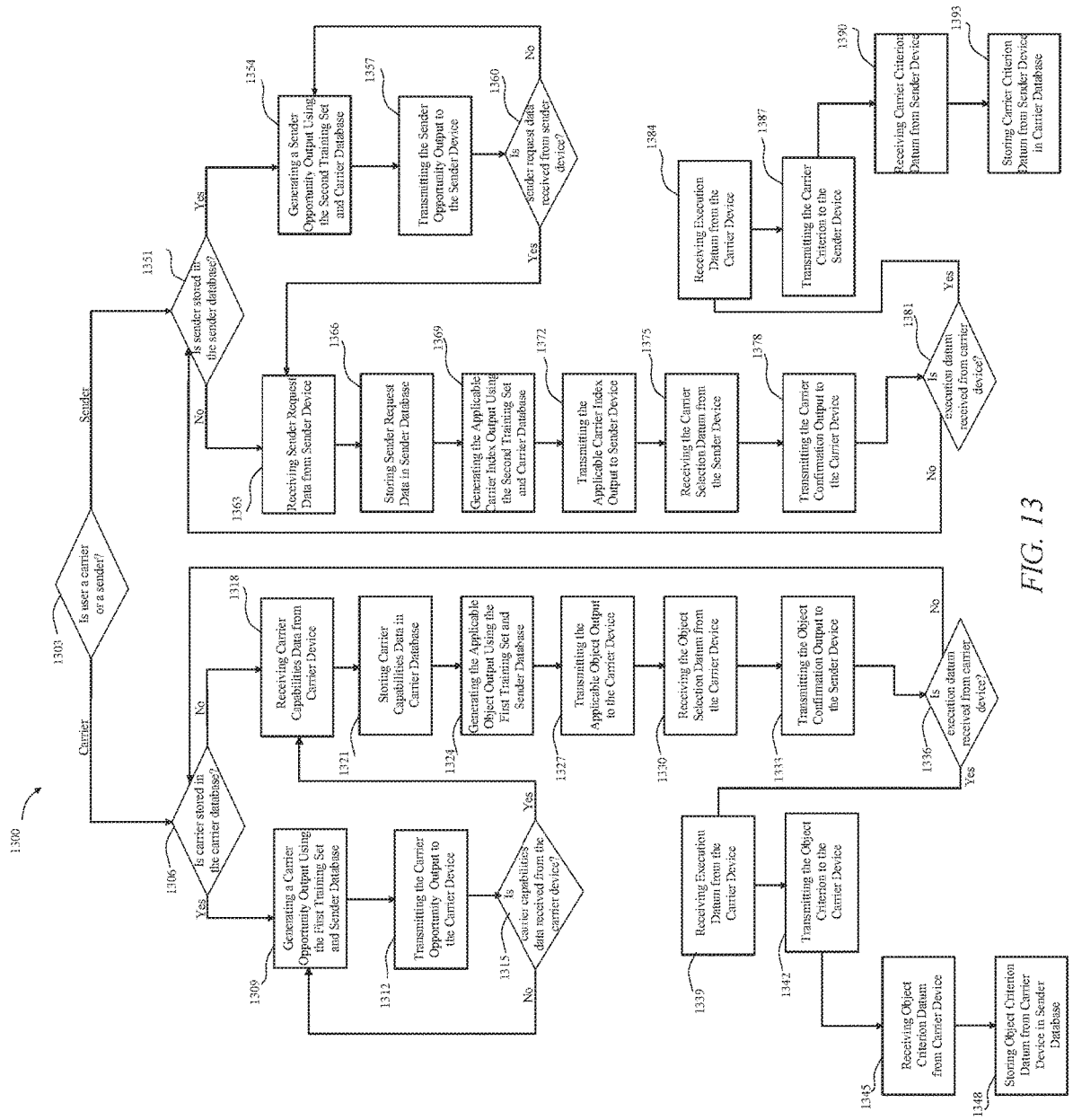
FIG. 13 is a flow diagram illustrating an exemplary method of coordinating physical transport of an object utilizing artificial intelligence.

Referring now to FIG. 13, an exemplary embodiment of a method 1300 of coordinating physical transport of an object utilizing artificial intelligence is illustrated. Step 1303 requires a determination if the user is a carrier or a sender. Carrier may include, without limitation, carriers as described above in reference to FIG. 1. Sender may include, without limitation, senders as described above in reference to FIG. 1. If SENDER, program flows to step 1351 wherein a determination is required as to if the sender is stored in sender database 320. If CARRIER, program flow continues on to step 1306.

At step 1306, still referring to FIG. 13, a determination is required on if the carrier is stored in the carrier database 220. If NO, program flows to step 1318 wherein the program receives carrier capabilities data from carrier device 104. If YES, the program continues on to step 1309. At step 1309, carrier opportunity forecasting engine 108 operating on the at least a server 102 generates a carrier opportunity output 408 using the first training data set 110 and sender database 320, as described above in reference to FIGS. 1-5. Step 1312 comprises transmitting the carrier opportunity output 408 to the carrier device 104. Transmitting may include, without limitation, any process and/or steps of processes to transmit the carrier opportunity output 408 to carrier device 104 utilizing first graphical user interface 120, as described above in reference to FIGS. 1-5.

With continued reference to FIG. 13, step 1315 required a determination if carrier capabilities data is received from carrier device 104. Carrier capabilities data may include, without limitation, upcoming trip datum and/or object prospect datum, as described above in reference to FIG. 1. If NO, program slows back to step 1309 and carrier opportunity forecasting engine 108 operating on the at least a server 102 generates a carrier opportunity output 408 using the first training data set 110 and sender database 320. If YES, program continues on to step 1318. Step 1318 comprises the program receiving carrier capabilities data from carrier device 104. Carrier capabilities data may include, without limitation, upcoming trip datum and/or object prospect datum as described above. Step 1321 carrier opportunity forecasting engine 108 operating on the at least a server 102 stores carrier capabilities data in carrier database 220.

At step 1324, and continuing to reference FIG. 13, the sender qualification module 140 operating on the at least a server 102 generating the applicable object output 804 using the first training data set 110 and sender database 320. Generating the applicable object output 804 may include generating a loss function, as described above in reference to FIGS. 1-8. Step 1327 comprises the sender qualification module 140 operating on the at least a server 102 transmitting the applicable object output 804 to carrier device 104. An applicable object output may include, without limitation, the applicable object output as described above in reference to FIG. 8. Transmitting may include, without limitation, any process and/or steps of processes to transmit the applicable object output 804 to carrier device 104 utilizing first graphical user interface 120, as described above in reference to FIGS. 1-8. Step 1330 comprises the sender qualification module 140 operating on the at least a server 102 receiving the object selection datum 808 from carrier device 104. An object selection datum may include, without limitation, any object selection datum as described above in reference to FIG. 8. Receiving may include, without limitation, any process and/or steps of processes to receive object selection datum 808 from carrier device 104 utilizing first graphical user interface 120, as described above in reference to FIGS. 1-8. Step 1333 comprises the sender qualification module 140 operating on the at least a server 102 transmitting the object confirmation output 812 to sender device 106. An object confirmation output may include, without limitation, any object confirmation output as described above in reference to FIG. 8. Transmitting may include, without limitation, any transmission process and/or steps of processes as described above.

Still referring to FIG. 13, step 1336 requires a determination if execution datum is received from carrier device 104. Execution datum may include, without limitation, any execution datum as described above in reference to FIG. 10. If NO, program flows back to step 1306 to again determine if the carrier is stored in carrier database 220. If YES, program flows to 339. Step 1339 comprises the experience reflection module 144 operating on the at least a server 102 receiving execution datum from carrier device 104. Step 1342 comprises the experience reflection module 144 operating on the at least a server 102 transmitting the object criterion datum 1000 to carrier device 104. Object criterion datum may include, without limitation, any object criterion datum as described above in reference to FIG. 10. Transmission may include, without limitation, any process and/or steps of processes to transmit object criterion datum 1000 to carrier device 104 utilizing first graphic user interface 120, as described above in reference to FIGS. 1-10. Step 1345 comprises experience reflection module 144 operating on the at least a server 102 receiving object criterion datum 1000 from carrier device 104. Receiving may include, without limitation, any processes and/or steps of processes to receive object criterion datum 1000 from carrier device 104 utilizing first graphical user interface 120, as described above in reference to FIGS. 1-10. Step 1348 comprises experience reflection module 144 operating on the at least a server 102 storing object criterion datum 1000 from carrier device 104 associated to sender request data from sender device 106 in sender database 320. Storing may include, without limitation, any processes and/or process steps to store object criterion datum 1000 in sender database 320, as described above in reference to FIG. 10.

At step 1351, still referring to FIG. 13, a determination is required on if the sender is stored in the sender database 320. If NO, program flows to step 1363 wherein the program receives sender data from sender device 106. If YES, the program continues on to step 1354. At step 1354, sender opportunity forecasting engine 124 operating on the at least a server 102 generates a sender opportunity output 508 using the second training data set 126 and carrier database 220, as described above in reference to FIGS. 1-5. Step 1357 comprises transmitting the sender opportunity output 508 to the sender device 106. Transmitting may include, without limitation, any process and/or steps of processes to transmit the sender opportunity output 508 to sender device 106 utilizing second graphical user interface 136, as described above in reference to FIGS. 1-5.

With continued reference to FIG. 13, step 1360 required a determination if sender request data is received from sender device 106. Sender request data may include, without limitation, object detail datum and/or carrier stipulation datum, as described above in reference to FIG. 1. If NO, program flows back to step 1354 and sender opportunity forecasting engine 124 operating on the at least a server 102 generates a sender opportunity output 508 using the second training data set 126 and carrier database 220. If YES, program continues on to step 1363. Step 1363 comprises the program receiving sender request data from sender device 104. Sender request data may include, without limitation, object detail datum and/or carrier stipulation datum as described above. Step 1366 sender opportunity forecasting engine 124 operating on the at least a server 102 stores sender request data in sender database 320.

At step 1369, and continuing to reference FIG. 13, the carrier qualification module 142 operating on the at least a server 102 generating the applicable carrier index output 904 using the second training data set 126 and carrier database 220. Generating the applicable carrier index output 904 may include generating a loss function, as described above in reference to FIGS. 1-9. Step 1372 comprises the carrier qualification module 142 operating on the at least a server 102 transmitting the applicable carrier index output 904 to sender device 106. An applicable carrier index output may include, without limitation, the applicable carrier index output as described above in reference to FIG. 9. Transmitting may include, without limitation, any process and/or steps of processes to transmit the applicable carrier index output 904 to sender device 106 utilizing second graphical user interface 136, as described above in reference to FIGS. 1-9. Step 1375 comprises the carrier qualification module 142 operating on the at least a server 102 receiving the carrier selection datum 908 from sender device 106. A carrier selection datum may include, without limitation, any carrier selection datum as described above in reference to FIG. 9. Receiving may include, without limitation, any process and/or steps of processes to receive carrier selection datum 908 from sender device 106 utilizing second graphical user interface 136, as described above in reference to FIGS. 1-9. Step 1378 comprises the carrier qualification module 142 operating on the at least a server 102 transmitting the carrier confirmation output 912 to carrier device 104. A carrier confirmation output may include, without limitation, any carrier confirmation output as described above in reference to FIG. 9. Transmitting may include, without limitation, any transmission process and/or steps of processes as described above.

Still referring to FIG. 13, step 1381 requires a determination if execution datum is received from carrier device 104. Execution datum may include, without limitation, any execution datum as described above in reference to FIG. 10. If NO, program flows back to step 1351 to again determine if the sender is stored in sender database 320. If YES, program flows to 1384. Step 1384 comprises the experience reflection module 144 operating on the at least a server 102 receiving execution datum from carrier device 104. Step 1342 comprises the experience reflection module 144 operating on the at least a server 102 transmitting the carrier criterion datum 1008 to sender device 106. Carrier criterion datum may include, without limitation, any carrier criterion datum as described above in reference to FIG. 10. Transmission may include, without limitation, any process and/or steps of processes to transmit carrier criterion datum 1008 to sender device 106 utilizing second graphic user interface 136, as described above in reference to FIGS. 1-10. Step 1390 comprises experience reflection module 144 operating on the at least a server 102 receiving carrier criterion datum 1008 from sender device 106. Receiving may include, without limitation, any processes and/or steps of processes to receive carrier criterion datum 1008 from sender device 106 utilizing second graphical user interface 136, as described above in reference to FIGS. 1-10. Step 1393 comprises experience reflection module 144 operating on the at least a server 102 storing carrier criterion datum 1008 from sender device 106 associated to carrier capabilities data from carrier device 104 in carrier database 220. Storing may include, without limitation, any processes and/or process steps to store carrier criterion datum 1008 in carrier database 220, as described above in reference to FIG. 10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
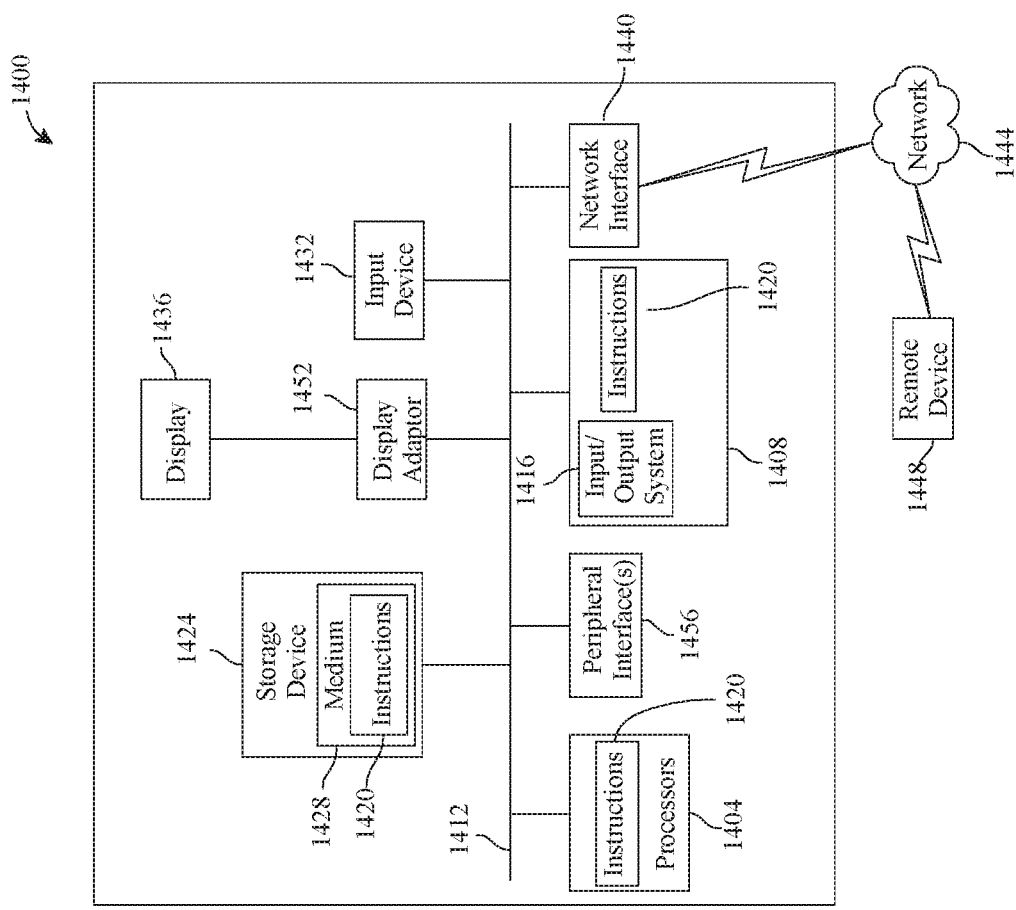
FIG. 14 is a high-level block diagram of a computing system that can be used to implement any one or more of the methodologies disclosed herein and any one or more portions thereof.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Memory 1408 may include various components (e.g., machine-readable media) including, but not limited to, a random access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for coordinating physical transport of an object utilizing artificial intelligence, the system comprising:
   at least a server, the at least a server is designed and configured to:
      receive carrier capabilities data from at least a carrier device, wherein the carrier capabilities data further comprises:
         at least an upcoming trip datum; and
         at least an object prospect datum;
      receive sender request data from at least a sender device, wherein the sender request data further comprises:
         at least an object detail datum; and
         at least a carrier stipulation datum;
   a carrier opportunity forecasting engine operating on the at least a server wherein the carrier opportunity forecasting engine is configured to:
      store the sender request data, for each sender device of the plurality of sender devices, in at least a sender database;
      receive a first training data set including a plurality of first data entries, each first data entry of the plurality of first data entries including at least a sender requirement label and at least a correlated sender possibility label;
      create at least a first machine-learning model relating sender request data to sender possibility labels using the at least a first training set and at least a sender database;
      generate a carrier opportunity output using the first training set, sender request data and the at least a sender database; and
      transmit the carrier opportunity output to the at least a carrier device;
   a sender opportunity forecasting engine operating on the at least a server wherein the sender opportunity forecasting engine is configured to:
      store the carrier capabilities data, for each carrier device of the plurality of carrier devices, in at least a carrier database;
      receive a second training data set including a plurality of second training data entries, each second data entry of the plurality of second data entries including at least a carrier requirement label and at least a correlated carrier possibility label;
      create at least a second machine-learning model relating carrier capabilities data to carrier possibility labels using the at least a second training set and the at least a carrier database;
      generate a sender opportunity output using the second training set, carrier capabilities data, and the at least a carrier database; and
      transmit the sender opportunity output to the at least a sender device;
   a sender qualification module operating on the at least a server wherein the sender qualification module is configured to:

identify at least a sender requirement label; and
generate at least an applicable object output as a function of the first training data set and the carrier capabilities data;
a carrier qualification module operating on the at least a server wherein the carrier qualification module is configured to:
identify at least a carrier requirement label; and
generate at least an applicable carrier index output as a function of the second training data set and the sender request data.

2. The system of claim 1, wherein the carrier opportunity forecasting engine further comprises a sender requirement forecasting module, wherein the sender requirement forecasting module is designed and configured to:
receive a third training data set including a plurality of third data entries, each third data entry of the plurality of third data entries including at least a carrier inclination label and at least a correlated sender request label; and
create at least a third machine-learning model as a function the at least a third training set, carrier database, and the carrier capabilities data from the at least a carrier device, wherein creating the third machine-learning model further comprises:
associating the at least a carrier capabilities data from the at least a carrier database and carrier inclination datum; and
generating at least a sender requirement label by relating the carrier inclination datum and the third training data set.

3. The system of claim 2, wherein the sender opportunity forecasting engine operating on the at least a server further comprises a carrier requirement forecasting module, wherein the carrier requirement forecasting module is configured and designed to:
receive a fourth training data set including a plurality of fourth data entries, each fourth data entry of the plurality of fourth data entries including at least a sender inclination label and at least a correlated carrier capabilities label; and
create at least a fourth machine-learning model as a function the at least a fourth training set and the sender request data from the at least a sender device, wherein creating the fourth machine-learning model further comprises:
associating the at least a sender request data from the at least a sender database and the sender inclination datum; and
generating at least a carrier requirement label as a function of relating the sender inclination datum and the fourth training data set.

4. The system of claim 1, wherein the sender qualification module is further designed and configured to generate at least an applicable object output by:
generating a loss function of at least a user variable wherein the at least a user variable further comprises a carrier priority input; and
minimizing the loss function.

5. The system of claim 1, wherein the sender qualification module operating on the at least a server is further configured and designed to:
transmit the at least an applicable object output to the at least a carrier device;
receive at least an object selection datum from the at least a carrier device wherein the at least an object selection datum contains the at least a sender request datum from the at least a sender device; and
transmit at least an object confirmation output to the at least a sender device associated to the at least a sender request datum.

6. The system of claim 1, wherein the carrier qualification module is further designed and configured to generate at least an applicable carrier output by:
generating a loss function of at least a user variable wherein the at least a user variable further comprises a sender priority input; and
minimizing the loss function.

7. The system of claim 1, wherein the carrier qualification module operating on the at least a server is further configured and designed to:
transmit the at least an applicable carrier output to the at least a sender device;
receive at least a carrier selection datum from the at least a sender device wherein the at least a carrier selection datum contains the at least a carrier capabilities datum from the at least a carrier device; and
transmit at least a carrier confirmation output to the at least a carrier device associated to the at least a carrier capabilities datum.

8. The system of claim 1, wherein the server further comprises an experience reflection module, wherein the experience reflection module is designed and configured to:
receive at least an execution datum from the at least a carrier device;
transmit at least an object criterion to the at least a carrier device;
transmit at least a carrier criterion to the at least a sender device;
receive at least an element of object criterion datum from the at least a carrier device; and
receive at least an element of carrier criterion datum from the at least a sender device.

9. The system of claim 1, wherein the at least an experience reflection module is further configured to store the at least an element of object criterion datum for each carrier device of the plurality of carrier devices within at least a sender database based on the sender device associated to the object selection datum.

10. The system of claim 1, wherein the at least an experience reflection module is further configured to store the at least a carrier criterion datum for each sender device of the plurality of sender devices within the at least a carrier database based on the carrier device associated to the carrier selection datum.

11. A method coordinating physical transport of an object utilizing artificial intelligence, the method comprising:
receiving by at least a server carrier capabilities data wherein carrier capabilities data further comprises:
receiving at least an upcoming trip datum from a carrier device; and
receiving at least an object prospect datum from a carrier device;
receiving by at least a server sender request data wherein sender request data further comprises:
receiving at least an object datum from a sender device; and
receiving at least a carrier stipulation datum from a sender device;
transmitting by at least a carrier opportunity forecasting engine operating on the at least a server the at least a carrier opportunity output to the at least a carrier device wherein transmitting the at least a carrier opportunity output further comprises:
  storing the sender request data, for each sender device of the plurality of sender devices, in at least a sender database;
  receiving a first training data set including a plurality of first data entries, each first data entry of the plurality of first data entries including at least a sender requirement label and at least a correlated sender possibility label;
  creating at least a first machine-learning model relating sender request data to sender possibility labels using the at least a first training set and at least a sender database; and
  generating the at least a carrier opportunity output using the first training set and the at least a sender database;
transmitting by at least a sender opportunity forecasting engine operating on the at least a server the at least a sender opportunity output to the at least a sender device wherein transmitting the at least a sender opportunity output further comprises:
  storing the carrier capabilities data in at least a carrier database for each carrier device of the plurality of carrier devices;
  receiving a second training data set including a plurality of second data entries, each second data entry of the plurality of second data entries including at least a carrier requirement label and at least a correlated carrier possibility label;
  creating at least a second machine-learning model relating carrier capabilities data to carrier possibility labels using the at least a second training set and the at least a carrier database;
  generating a sender opportunity output using the second training set and the at least a carrier database;
generating by at least a sender qualification module operating on the at least a server the at least an applicable object output as a function of the first training data set and the carrier capabilities data, wherein generating at least an applicable object output further comprises:
  identifying at least a sender requirement label;
generating by at least a carrier qualification module operating on the at least a server at least an applicable carrier index output as a function of the second training data set and the sender request data, wherein generating at least an applicable carrier output further comprises:
  identifying at least a carrier requirement label.

12. The method of claim 11, wherein the at least a carrier opportunity forecasting engine operating on the at least a server further comprises a sender requirement forecasting module wherein the sender requirement forecasting module further comprises:
  receiving a third training data set including a plurality of third data entries, each third data entry of the plurality of third data entries including at least a carrier inclination label and at least a correlated sender request label;
  creating at least a machine-learning model as a function the at least a first training set and the carrier capabilities data from the at least a carrier device, wherein creating the machine-learning model further comprises:
    associating the at least a carrier capabilities data from the at least a carrier database and carrier inclination datum; and
    generating at least a sender requirement label as a function of relating the carrier inclination datum and the third training data set.

13. The method of claim 11, wherein the sender opportunity forecasting engine operating on the at least a server further comprises a carrier requirement forecasting module wherein the carrier requirement forecasting module further comprises:
  receiving a fourth training data set including a plurality of fourth data entries, each fourth data entry of the plurality of fourth data entries including at least a sender inclination label and at least a correlated carrier capabilities label;
  creating at least a machine-learning model as a function the at least a third training set and the sender request data from the at least a sender device, wherein creating the machine-learning model further comprises:
    associating the at least a sender request data from the at least a sender database and the sender inclination datum; and
    generating at least a carrier requirement label as a function of relating the sender inclination datum and the fourth training data set.

14. The method of claim 11, wherein the sender qualification module further comprises generating at least an applicable object output by:
  generating a loss function of at least a user variable wherein the at least a user variable further comprises a carrier priority input; and
  minimizing the loss function.

15. The method of claim 11, wherein the sender qualification module operating on the at least a server further comprises:
  transmitting the at least an applicable object output to the at least a carrier device;
  receiving at least an object selection datum from the at least a carrier device wherein the at least an object selection datum contains the at least a sender request datum from the at least a sender device; and
  transmitting at least an object confirmation output to the at least a sender device associated to the at least a sender request datum.

16. The method of claim 11, wherein the carrier qualification module further comprises generating at least an applicable carrier output by:
  generating a loss function of at least a user variable wherein the at least a user variable further comprises a sender priority input; and
  minimizing the loss function.

17. The method of claim 11, wherein the carrier qualification module operating on the at least a server further comprises:
  transmitting the at least an applicable carrier output to the at least a sender device;
  receiving at least a carrier selection datum from the at least a sender device wherein the at least a carrier selection datum contains the at least a carrier capabilities datum from the at least a carrier device; and
  transmitting at least a carrier confirmation output to the at least a carrier device associated to the at least a carrier capabilities datum.

18. The method of claim 11, wherein the at least a server further comprises an experience reflection module, wherein the experience reflection module further comprises:
  receiving the at least an execution datum from the at least a carrier device;

transmitting at least an object criterion to the at least a carrier device;
transmitting at least a carrier criterion to the at least a sender device;
receiving at least an element of object criterion datum from the at least a carrier device; and
receiving at least an element of carrier criterion datum from the at least a sender device.

19. The method of claim 11, wherein the at least an experience reflection module operating on the at least a server further comprises storing the at least an element of object criterion datum for each carrier device of the plurality of carrier devices within at least a sender database based on the sender device associated to the object selection datum.

20. The method of claim 11, wherein the at least an experience reflection module operating on the at least a server further comprises storing the at least a carrier criterion datum for each sender device of the plurality of sender devices within the at least a carrier database based on the carrier device associated to the carrier selection datum.

* * * * *